United States Patent
Urban et al.

(10) Patent No.: US 9,287,971 B2
(45) Date of Patent: Mar. 15, 2016

(54) PON SUPERVISION USING OTDR MEASUREMENTS

(75) Inventors: Patryk Urban, Vallingby (SE); Gemma Vall-Llosera, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/124,043

(22) PCT Filed: Jun. 10, 2011

(86) PCT No.: PCT/SE2011/050714
§ 371 (c)(1),
(2), (4) Date: Dec. 5, 2013

(87) PCT Pub. No.: WO2012/169946
PCT Pub. Date: Dec. 13, 2012

(65) Prior Publication Data
US 2014/0147109 A1 May 29, 2014

(51) Int. Cl.
*H04B 10/071* (2013.01)
*H04B 10/291* (2013.01)
(Continued)

(52) U.S. Cl.
CPC ......... *H04B 10/071* (2013.01); *G01M 11/3127* (2013.01); *G01M 11/3136* (2013.01); *H04B 10/291* (2013.01); *H04Q 2011/009* (2013.01)

(58) Field of Classification Search
CPC .................. H04B 10/071–10/0771; G01M 11/31–11/3136
See application file for complete search history.

(56) References Cited

U.S. PATENT DOCUMENTS

| 6,396,573 | B1 * | 5/2002 | Pimpinella .................... 356/73.1 |
| 7,369,219 | B2 * | 5/2008 | Rosolem et al. ............. 356/73.1 |
| 8,724,102 | B2 | 5/2014 | Urban |

(Continued)

FOREIGN PATENT DOCUMENTS

| WO | WO-96/31022 | 10/1996 |
| WO | WO-97/24821 | 7/1997 |

(Continued)

OTHER PUBLICATIONS

PCT Notification of Transmittal of the International Search Report and the Written Opinion of the International Searching Authority for PCT Counterpart Application No. PCT/SE2011/050714, (May 9, 2012), 18 pages.

(Continued)

*Primary Examiner* — David Payne
*Assistant Examiner* — Casey Kretzer
(74) *Attorney, Agent, or Firm* — Nicholson De Vos Webster & Elliott LLP

(57) ABSTRACT

A Wavelength Adaptation Module and a method therein for adapting an Optical Time Domain Reflectometry, OTDR, signal for supervision of Optical Network Terminals, ONTs, in a Passive Optical Network, PON, are provided. The wavelength of the OTDR signal is adapted to have a pre-selected wavelength to enable a splitter in a remote node to forward the OTDR signal to a dedicated group of ONTs in the PON, thereby supervising the fiber links between the remote node and the dedicated group of ONTs. Likewise, a remote node and a method therein for receiving an OTDR signal having a pre-selected wavelength from the Wavelength Adaptation Module and for outputting the OTDR signal to a dedicated group of ONTs with regards to the pre-selected wavelength of the received OTDR signal are provided.

18 Claims, 23 Drawing Sheets

(51) Int. Cl.
   *H04Q 11/00* (2006.01)
   *G01M 11/00* (2006.01)

(56) References Cited

U.S. PATENT DOCUMENTS

| | | | |
|---|---|---|---|
| 2006/0164628 A1 | 7/2006 | Kuo | |
| 2006/0222364 A1 | 10/2006 | Chung et al. | |
| 2006/0245688 A1* | 11/2006 | Gall et al. | 385/24 |
| 2007/0165978 A1* | 7/2007 | Chen et al. | 385/12 |
| 2007/0183778 A1* | 8/2007 | Jung et al. | 398/72 |
| 2008/0062408 A1 | 3/2008 | Lai et al. | |
| 2008/0291431 A1 | 11/2008 | Wang et al. | |
| 2009/0047025 A1* | 2/2009 | Hong et al. | 398/135 |
| 2009/0263123 A1 | 10/2009 | Zhu et al. | |
| 2011/0078755 A1 | 3/2011 | Dai | |
| 2014/0126900 A1 | 5/2014 | Urban | |

FOREIGN PATENT DOCUMENTS

| | | |
|---|---|---|
| WO | WO-2009/006837 | 1/2009 |
| WO | 2010126427 A1 | 11/2010 |

OTHER PUBLICATIONS

PCT Notification of Transmittal of the International Preliminary Report on Patentability for PCT Counterpart Application No. PCT/SE2011/050714, (Jul. 11, 2013), 13 pages.

Ab-Rahman, et al., "The overview of fiber fault localization technology in TDM-PON network," *Electronic Design, 2008. ICED 2008. International Conference on, IEEE*, (Dec. 1, 2008), pp. 1-8.

Yuksel, K., et al., "Centralised Optical Monitoring of Tree-structured Passive Optical Networks using a Raman-assisted OTDR," *Transparent Optical Networks, 2007. ICTON '07. 9th International Conference on, IEEE*, (Jul. 1, 2007), pp. 175-178.

First Office Action for China Application No. 201180071539.0, mailed Sep. 14, 2015, 17 pages.

Search Report for China Application No. 201180071539.0, mailed Aug. 11, 2015, 2 pages.

K. Yuksei et al., "Optical Layer Monitoring in Passive Optical Networks (PONs): A Review," in Proc. ICTON, 2008, paper Tu.B1.1., pp. 92-98.

ITU-T, "Series L: Construction, Installation and Protection of Cables and Other Elements of Outside Plants; Optical fibre outside plant maintenance support, monitoring and testing system", International Telecommunication Union, L.40, (Oct. 2000), 42 pages.

ITU-T, "Series L: Construction, Installation and Protection of Cables and Other Elements of Outside Plant; Optical fibre cable maintenance criteria for in-service fibre testing in access networks", International Telecommunication Union, L.66, (May 2007), 17 pages.

ITU-T, "Series G: Transmission Systems and Media, Digital SYstems and Networks; 10 Gigabit-capable Passive Optical Networks (XG-PON): General requirements", International Telecommunication Union, G.987.1, (Jan. 2010), 52 pages.

ITU-T, "Series L: Construction, Installation and Protection of Cables and Other Elements of Outside Plants; Optical fibre maintenance criteria for access networks", International Telecommunications Union, L.53 (May 2003), 25 pages.

P. Urban et al., "OTM- and OTDR-based cost-efficient Fiber Fault Identification and Localization in Passive Optical Network", Proc. OFC 2011, 3 pages.

S. Kamei et al., "NxN Cyclic-Frequency Router With Improved Performance Based on Arrayed-Waveguide Grating", Journal of Lightwave Technology, vol. 27, No. 18, Sep. 15, 2009, pp. 4097-4104.

ITU-T, "Series G: Transmission Systems and Media, Digital Systems and Networks; Gigabit-capable Passive Optical Networks (G-PON): Physical Media Dependent (PMD) layer specification", International Telecommunication Union, G.984.2 Amnd. 2, (Mar. 2008), 16 pages.

* cited by examiner

PON SUPERVISION USING OTDR MEASUREMENTS

CROSS-REFERENCE TO RELATED APPLICATIONS

This application is a National stage of International Application No. PCT/SE2011/050714, filed Jun. 10, 2011, which is hereby incorporated by reference.

TECHNICAL FIELD

Embodiments herein relate generally to supervision of Passive Optical Networks, PONS. Embodiments herein relate in particular to supervision of PONs by means of adapting or tuning the OTDR measuring signals.

BACKGROUND

A Passive Optical Network, PON, is a point-to-multipoint network architecture employing fibre cables from a central office to premises. It employs unpowered optical splitters to enable a single optical fibre to serve multiple premises. A PON comprises an Optical Line Terminal, OLT, at the central office of the service provider. It comprises a number of Optical Network Terminals, ONTs, near end users. A PON configuration reduces the amount of fibre and central office equipment required compared with point-to-point architectures. A passive optical network is a form of fibre-optic access network.

In order to supervise and monitor the performance of a PON, Optical Time-Domain Reflectometry, OTDR, is used. An OTDR device injects a series of optical pulses into the fibre. The series of optical pulses, also called OTDR signal travel down the network towards the ONTs. Parts of the OTDR signals are reflected back towards the OTDR device. The back-reflected, or back-scattered, OTDR signal may be used for estimating the fibre's length and overall attenuation, including splitter losses. The back-scattered OTDR signal may also be used to locate faults, such as breaks, and to measure optical return loss.

Generally, some requirements are placed on a monitoring or supervision system. Monitoring should not influence regular data communication, i.e. it should be non-invasive. This is achievable by utilisation of a dedicated optical bandwidth for the measuring function. Further, the technique should be sensitive to relatively low power fluctuations detectable in on-demand or periodic modes. Still further, it should not require any high initial investment. This mainly yields that no additional monitoring functionality on the ONT side should be needed and PON monitoring functionality should be shared over a complete PON system or a group of PON systems.

The today's existing solutions for providing supervision or monitoring do only satisfy some of the above requirements. Most of the solutions existing today significantly increase capital expenditures because they require either a customised OTDR device, which is expensive, wavelength specific components in the fibre links (drop links) towards the ONTs, which causes power budget reduction, advanced OLT transmitter upgrades, e.g. light path doubling. Still further, most of today's existing solutions to provide supervision or monitoring can only detect a fault in a fibre link which introduces significant loss of more than 5 dB, far above an expected threshold of 1 dB.

SUMMARY

It is an object of the exemplifying embodiments to address at least some of the problems outlined above. In particular, it is an object of the exemplifying embodiments to provide a Wavelength Adaptation Module and a method therein for adapting an Optical Time Domain Reflectometry, OTDR, signal for supervision of Optical Network Terminals, ONTs, in a Passive Optical Network, PON, wherein the wavelength of the OTDR signal is adapted to have a pre-selected wavelength to enable a splitter in a remote node to forward the OTDR signal to a dedicated group of ONTs in the PON, thereby supervising the fibre links between the remote node and the dedicated group of ONTs. Likewise, it is an object of the exemplifying embodiments to provide a remote node and a method therein for receiving an OTDR signal having a pre-selected wavelength from the Wavelength Adaptation Module and for outputting the OTDR signal to a dedicated group of ONTs with regards to the pre-selected wavelength of the received OTDR signal.

These objects and others may be obtained by providing a Wavelength Adaptation Module and a Remote Node; and a method in a Wavelength Adaptation Module and a method in a Remote Node according to the independent claims attached below.

According to an aspect a method in a Wavelength Adaptation Module for adapting an OTDR signal for supervision of ONTs in a PON is provided. The method comprises receiving an OTDR signal comprising at least one wavelength; Red/Blue, R/B, filtering the received OTDR signal; and converting the filtered OTDR signal to a photoelectric current. The method further comprises combining the photoelectric current with an optical signal having a pre-selected wavelength from a Continuous Wavelength light source; amplitude modulating the combined photoelectric current and optical signal, thereby producing an amplitude modulated signal having the pre-selected wavelength of the optical signal, and outputting the amplitude modulated signal towards a Remote Node, RN, wherein the wavelength of the optical signal has been pre-selected to enable a splitter in the RN to forward the amplitude modulated signal to a dedicated group of ONTs in the PON, thereby supervising the fibre links between the RN and the dedicated group of ONTs.

According to yet an aspect, a Wavelength Adaptation Module configured to adapt an OTDR signal for supervision of ONTs in a PON is provided. The Wavelength Adaptation Module is configured to receive an OTDR signal comprising at least one wavelength; to Red/Blue, R/B, filter the received OTDR signal; and to convert the filtered OTDR signal to a photoelectric current. The Wavelength Adaptation Module is further configured to combine the photoelectric current with an optical signal having a pre-selected wavelength from a Continuous Wavelength light source; to amplitude modulate the combined photoelectric current and optical signal, thereby producing an amplitude modulated signal having the pre-selected wavelength of the optical signal; and to output the amplitude modulated signal towards a Remote Node, RN, wherein the wavelength of the optical signal has been pre-selected to enable a splitter in the RN to forward the amplitude modulated signal to a dedicated group of ONTs in the PON, thereby supervising the fibre links between the RN and the dedicated group of ONTs.

According to still an aspect, a method in a Remote Node, RN, in a PON, the PON comprising ONTs and a Wavelength Adaptation Module arranged in the fibre path between an OTDR device and the RN, the RN comprising a passive splitter arrangement is provided. The method comprises receiving an amplitude modulated signal having a pre-selected wavelength from the Wavelength Adaptation Module; and outputting the amplitude modulated signal to a dedicated group of ONTs with regards to the pre-selected wavelength of the received amplitude modulated signal.

According to an aspect, a Remote Node, RN, in a PON, the PON comprising ONTs and a Wavelength Adaptation Module arranged in the fibre path between an Optical Time Domain Reflectometry, OTDR device and the RN, the RN comprising a passive splitter arrangement is provided. The RN is adapted to receive an amplitude modulated signal having a pre-selected wavelength from the Wavelength Adaptation Module; and to output the amplitude modulated signal to a dedicated group of ONTs with regards to the pre-selected wavelength of the received amplitude modulated signal.

The Wavelength Adaptation Module, the Remote Node, and the respective method therein have several advantages.

They enable measurement and localization of any fibre fault in any part of the network of the PON. Further, they may reduce service provisioning downtime and maintenance costs. They provide a bandwidth- and time-efficient supervising of the PON. A single adapted wavelength channel is used to supervise a group of ONTs. The cost efficiency also lies in a high sharing factor because collocated PONS may be served by a single supervising system. Still further, a passive RN can be used in the PON. A passive RN is less expensive than a RN comprising active components. Yet an advantage is that the Wavelength Adaptation Module, the Remote Node, and the respective method therein provide high accuracy and fault detection sensitivity limited only by the performance of the applied OTDR device.

BRIEF DESCRIPTION OF DRAWINGS

Embodiments will now be described in more detail in relation to the accompanying drawings, in which.

DETAILED DESCRIPTION

Briefly described, a method in a Wavelength Adaptation Module, a Wavelength Adaptation Module as well as a method in a Remote Node, RN, and a Remote Node are provided for adapting or tuning an Optical Time Domain Reflectometry, OTDR, signal for supervision of Optical Network Terminals, ONTs, in a Passive Optical Network, PON. The wavelength tuning of the OTDR signal is performed in a manner such that the tuned wavelength enables the RN to forward the wavelength tuned OTDR signal to a dedicated group of ONTs in the PON, thereby supervising the fibre links between the RN and the dedicated group of ONTs.

First, a very general description of a PON is provided. This is done with reference to FIGS. 3a and 3b.

Figure 3A:
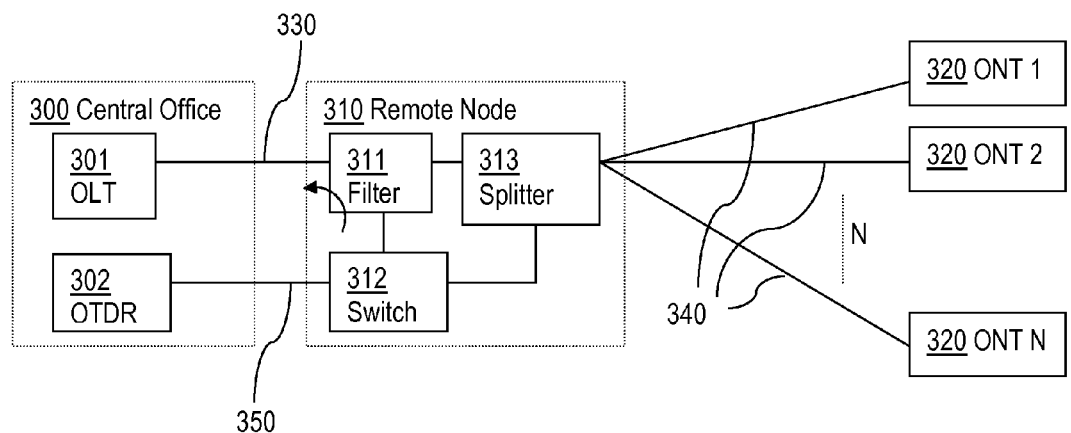
FIGS. 3a and 3b are block diagrams schematically illustrating two different examples of transmission of an amplitude modulated signal from a Wavelength Adaptation Module to a Remote Node.
Figure 3B:
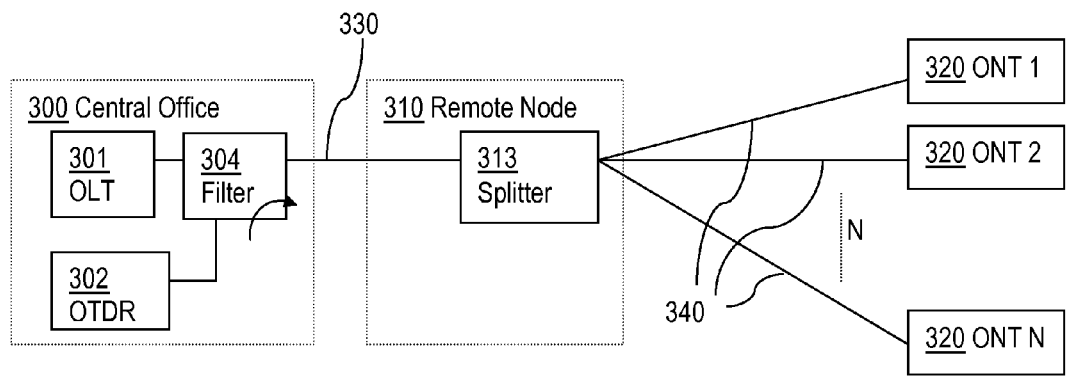

In general, a PON comprises a Central Office 300 having an Optical Line Termination 301, OLT, and an OTDR device 302. The OLT 301 transmits an information signal on a feeder fibre 330 to a RN 310 which has a splitter arrangement 313 which will forward the received information signal to one or more ONTs 320. The ONTs are connected to the RN 310 via fibre links 340, which are also referred to drop links 340. The OTDR device 302 transmits OTDR signals to the RN and the OTDR signals are forwarded to the ONTs. FIG. 3a illustrates an example of the OTDR device transmitting OTDR signals to the RN 310 on a dedicated fibre link 350; however, other configurations are possible as is illustrated in FIG. 3b. FIG. 3b illustrates the OTDR signals being transmitted to the RN 310 on the feeder fibre link 330. In this example, a filter 304 is arranged in the central office 300 such that information signals from the OLT 301 and OTDR signals from the OTDR device 302 are sent on the feeder fibre link 330.

Figure 1A:
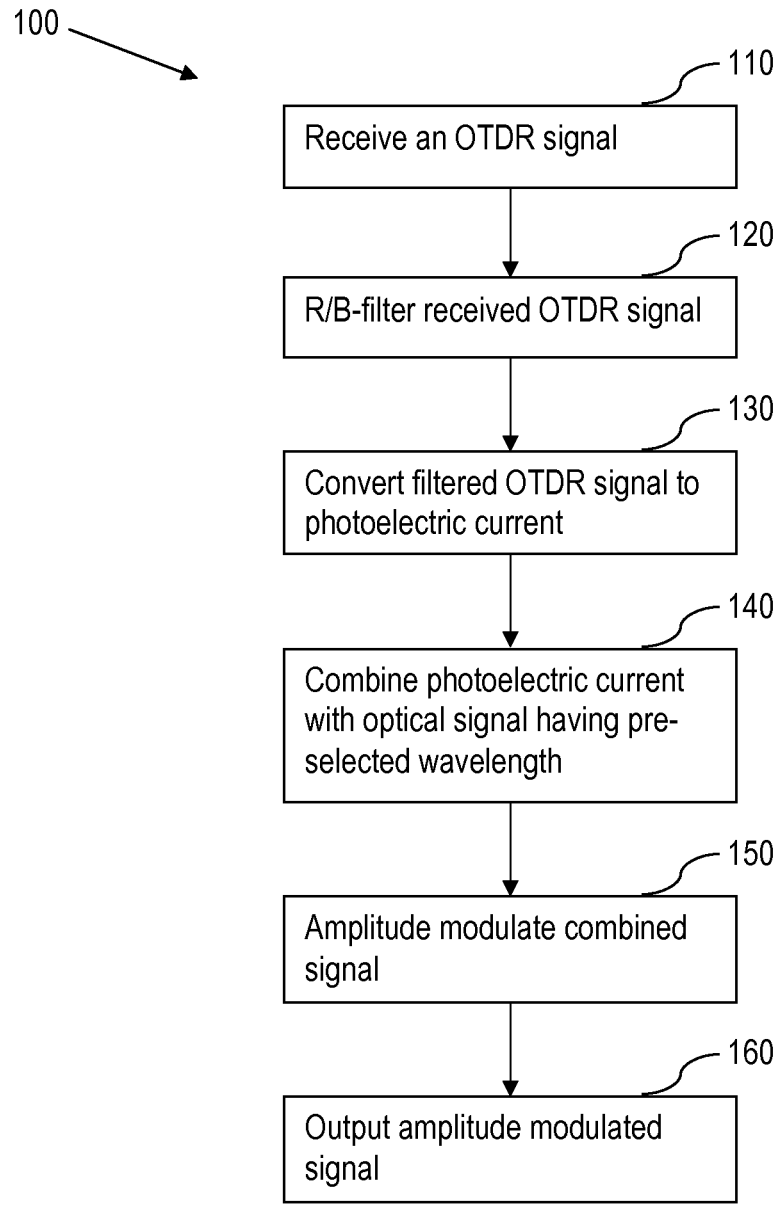
FIG. 1a is a flowchart illustrating an exemplifying embodiment of a method in a Wavelength Adaptation Module.
Figure 1B:
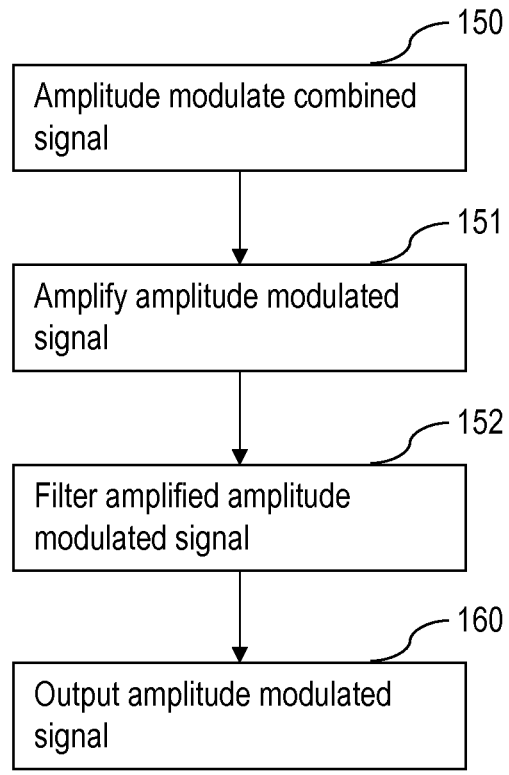
FIG. 1b is a flowchart illustrating yet an exemplifying embodiment of a method in a Wavelength Adaptation Module.
Figure 1C:
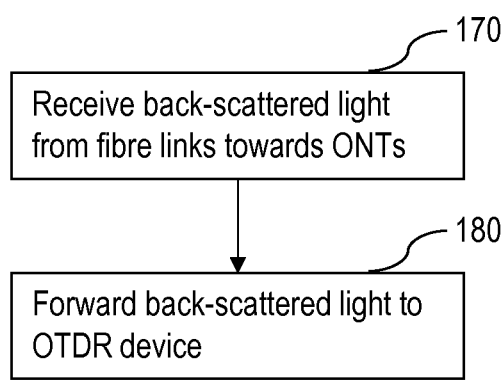
FIG. 1c is a flowchart illustrating still an exemplifying embodiment of a method in a Wavelength Adaptation Module.

An exemplifying embodiment of such a method in a Wavelength Adaptation Module for adapting an OTDR signal for supervision of ONTs in a PON will now be described with reference to the flowchart of FIG. 1*a*. In this exemplifying embodiment, the method 100 comprises receiving 110 an OTDR signal comprising at least one wavelength and Red/Blue, R/B, filtering 120 the received OTDR signal. The method further comprises converting 130 the filtered OTDR signal to a photoelectric current and combining 140 the photoelectric current with an optical signal having a pre-selected wavelength from a Continuous Wavelength light source. Still further, the method comprises amplitude modulating 150 the combined photoelectric current and optical signal, thereby producing an amplitude modulated signal having the pre-selected wavelength of the optical signal, and outputting 160 the amplitude modulated signal towards a Remote Node, RN. The wavelength of the optical signal has been pre-selected to enable a splitter in the RN to forward the amplitude modulated signal to a dedicated group of ONTs in the PON, thereby supervising the fibre links between the RN and the dedicated group of ONTs.

In this exemplifying embodiment of the method 100 in a Wavelength Adaptation Module for adapting or tuning an OTDR signal for supervision of ONTs in a PON, the OTDR signal is received 100. The OTDR signal typically comprises a plurality of different wavelengths. This plurality of different wavelengths typically comprises wavelengths of a pre-defined range from a first, lowest, wavelength to a last, highest, wavelength. Then several wavelengths are comprised in the OTDR signal ranging from the first wavelength to the last wavelength.

The OTDR signal is R/B-filtered 120 in order to filter out a desired range of wavelengths of the original received OTDR signal. The filtered out range of the received OTDR signal typically ranges from the first wavelength to a second wavelength, wherein the second wavelength is a wavelength between the first and the last wavelength, or from the second wavelength to the last wavelength. The second wavelength is defined or set by the R/B filtering arrangement performing the RB-filtering 120.

The R/B-filtered OTDR signal is then converted 130 into a photoelectric current. Further, the photoelectric current is combined 140 with an optical signal having a pre-selected wavelength from a Continuous Wavelength light source and amplitude modulated 150. By combining 140 the photoelectric current with the optical signal and amplitude modulating 150 the combined signal is meant that the optical signal is modulated using the photoelectric current and a modulated signal is obtained. The modulated signal has the pre-selected wavelength of the optical signal and it constitutes a new OTDR signal having the pre-selected wavelength and also having other characteristics required of an OTDR signal, e.g. a specific amplitude, a specific energy and so on. The modulation may be performed in different ways. In an example, the modulation is performed by changing the laser optical output power in a function of the photoelectric current. The function is in an example a linear function. This means that any change in current amplitude provided onto electrodes on a laser will result in direct change of the optical power transmitted from an output port of the laser.

The last step of the method is to output 160 the amplitude modulated signal towards a Remote Node, RN.

The wavelength of the optical signal has been pre-selected to enable a splitter in the RN to forward the amplitude modulated signal to a dedicated group of ONTs in the PON, thereby supervising the fibre drop links between the RN and the dedicated group of ONTs. This means that a passive splitter arrangement in the RN is configured to receive an OTDR signal and depending on the pre-selected wavelength of the received OTDR signal, the splitter arrangement will output the OTDR signal to a group of ONTs which are to be measured using the OTDR signal having a pre-selected wavelength. Just as an example, assume a RN has 4 groups of ONTs connected to it, each group comprising 8 ONTs. This means that, in practice, the RN has 32 ONTs connected to itself. Then 4 different pre-selected wavelengths are required to supervise the 32 ONTs as one wavelength is used to supervise one group of 32 ONTs. This will be described in more detail below. By passing the OTDR signal from an OTDR device, the OTDR signal is in other words tuned to the pre-selected wavelength.

The method has the advantage that it enables measurement and localization of any fibre fault in any part of the network of the PON. Further, the method can reduce service provisioning downtime and maintenance costs. The method provides a bandwidth- and time-efficient supervising of the PON. A single adapted wavelength channel is used to supervise a group of ONTs. The cost efficiency also lies in a high sharing factor because collocated PONS may be served by a single supervising system. Still further, a passive RN can be used in the PON. A passive RN is less expensive than a RN comprising active components. Yet an advantage is that the method provides high accuracy and fault detection sensitivity limited only by the performance of the applied OTDR device.

According to an embodiment, the method further comprises optically amplifying 151 the amplitude modulated signal and filtering 152 the optically amplified amplitude modulated signal before outputting the amplitude modulated signal towards the RN.

In this example, the amplitude modulated signal is too week, possibly resulting in that it cannot be used to supervise and detect any possible fault events in fibre links from the RN to the ONTs. In such a case, the amplitude modulated signal is first amplified 151 in order to be of a strength necessary to achieve reliable OTDR measurements of the fibre links from the RN to the ONTs. By amplifying the amplitude modulated signal also undesired noise may be either also amplified or introduced. In order to not send an OTDR signal having undesirable noise, the amplified OTDR signal having the pre-selected wavelength is filtered 152 in order to obtain an amplified OTDR signal with minimal noise to then be outputted 160 towards the RN. Hereinafter, an amplitude modulated signal may also be referred to as an OTDR signal having a pre-selected wavelength.

In yet an embodiment, the method 100 further comprises receiving 170 back-scattered light from the fibre links between the RN and the dedicated group of ONTs and forwarding 180 the back-scattered light to an OTDR device, thereby enabling analysis of the back-scattered light in order to detect any possible fault in any link between the RN and the dedicated group of ONTs.

The Wavelength Adaptation Module, in which the method is performed, is arranged in the path between the OTDR device and the RN. This will be described in more detail below. The Wavelength Adaptation Module should not interfere with back-scattered light from the fibre links between the RN and the dedicated group of ONTs and therefore, the back-scattered light is received 170 and forwarded 180.

According to still an embodiment, the OTDR signal and the optical signal having a pre-selected wavelength are received as a result of an alarm issued by an ONT belonging to the dedicated group of ONTs, wherein the pre-selected wavelength of the optical signal will enable the RN to forward the amplitude modulated signal to the dedicated group of ONTs.

In this example, an ONT belonging to a dedicated group of ONTs detects a failure or fault of some kind, for example loss of signal or low received signal power. The ONT detecting the fault issues an alarm as a result of the detection of the fault. The alarm triggers an OTDR measurement in order to locate the position along the drop link between the alarm issuing ONT and the RN, and also to determine the severity of the fault. Since it is known which ONTs has issued the alarm, it is determined which group of ONTs the ONT belongs to, i.e. the dedicated group. By determining the dedicated group of ONTs, the wavelength of the optical signal is pre-selected such that the RN will switch the OTDR signal having the pre-selected wavelength to the dedicated group of ONTs to which the alarm issuing ONT belongs. Thereby, supervising or monitoring of the drop links from the RN to the ONTs belonging to the group of ONTs is performed.

According to yet an embodiment, the optical signal is a laser signal.

According to still an embodiment, the outputting of the amplitude modulated signal towards the RN comprises transmitting the amplitude modulated signal to the RN on a dedicated fibre link, or on a feeder fibre link carrying data information from an Optical Line Terminal, OLT, to the RN.

In one example, the amplitude modulated signal is transmitted towards the RN on a dedicated fibre link. This means that the OTDR device and the Adaptation Wavelength Module are connected to RN via a dedicated fibre link which is reserved to transmitting OTDR signals to the RN. In such a case, the pre-selected wavelength is adapted or tuned to address a dedicated group of ONTs, but the OTDR signal having the pre-selected wavelength reaches the RN via a separate dedicated fibre and therefore an extra pre-selected wavelength is required to forward or inject the OTDR signal at the RN into the feeder fibre in order to provide monitoring or supervision of the feeder fibre. This feeder fibre measurement is done in an opposite direction as in the case where the Adaptation Wavelength Module is connected to RN via a feeder fibre which is also used by an OLT in a central office to send information signals.

In another example, the OTDR device and the Adaptation Wavelength Module is connected to RN via a feeder fibre which is also used by an OLT in a central office to send information signals. In such a case, the pre-selected wavelength is adapted or tuned to address a dedicated group of ONTs, but at the same time when drop links connecting the RN and the ONTs in the dedicated group of ONTs are measured, the feeder fibre is also measured, regardless wavelength adaptation or tuning, because the OTDR signal having the pre-selected wavelength is forwarded or injected into a common feeder fibre in the CO.

Embodiments herein also relate to a Wavelength Adaptation Module configured to adapt or tune an Optical Time Domain Reflectometry, OTDR, signal for supervision or monitoring of Optical Network Terminals, ONTs in a Passive Optical Network, PON.

Figure 2A:
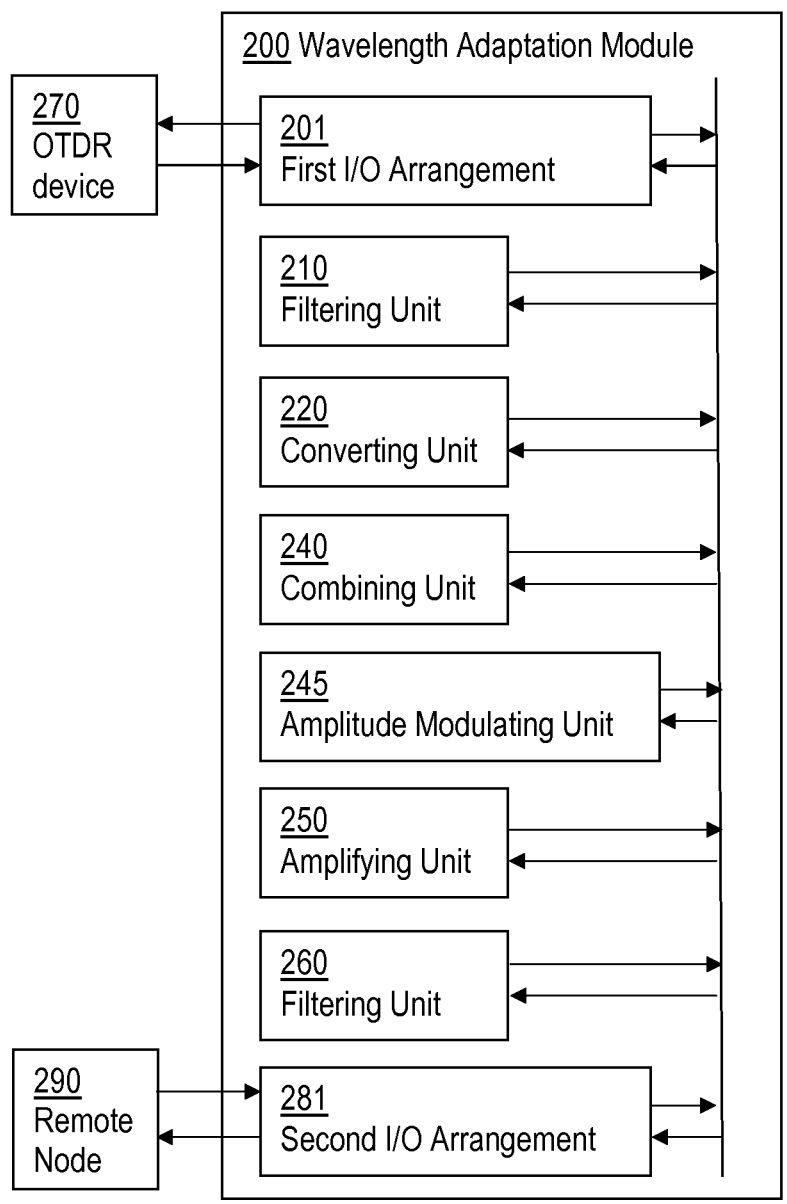
FIGS. 2a-2e are block diagrams schematically illustrating a Wavelength Adaptation Module.
Figure 2B:
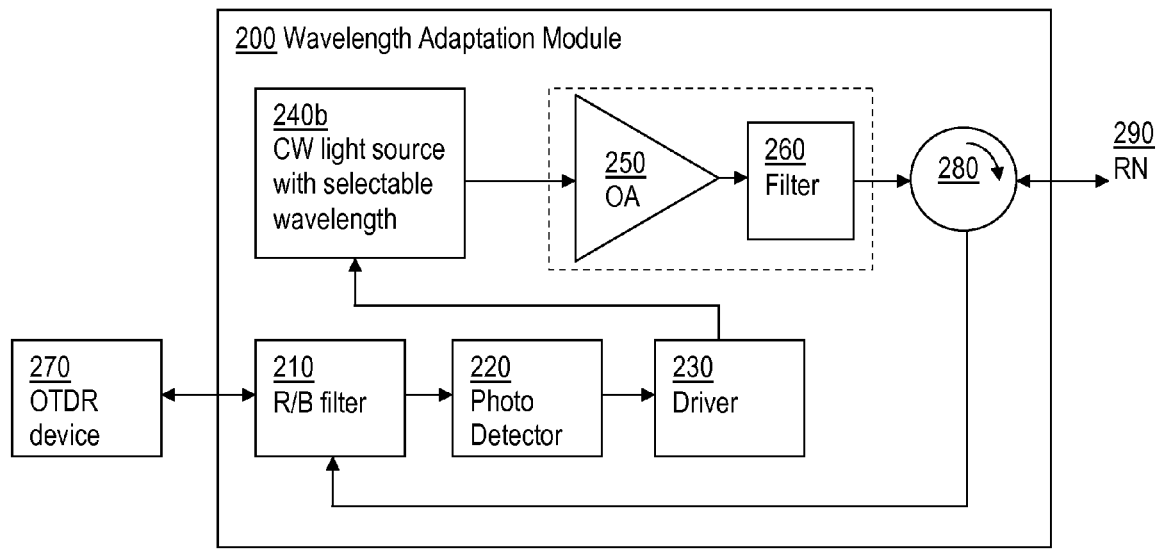
Figure 2C:
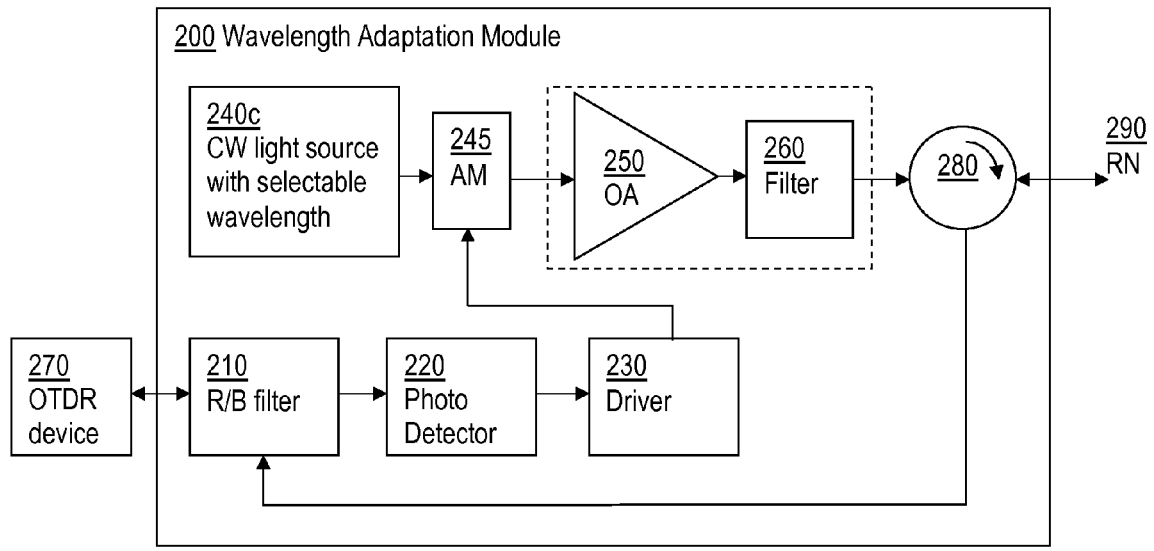
Figure 2D:
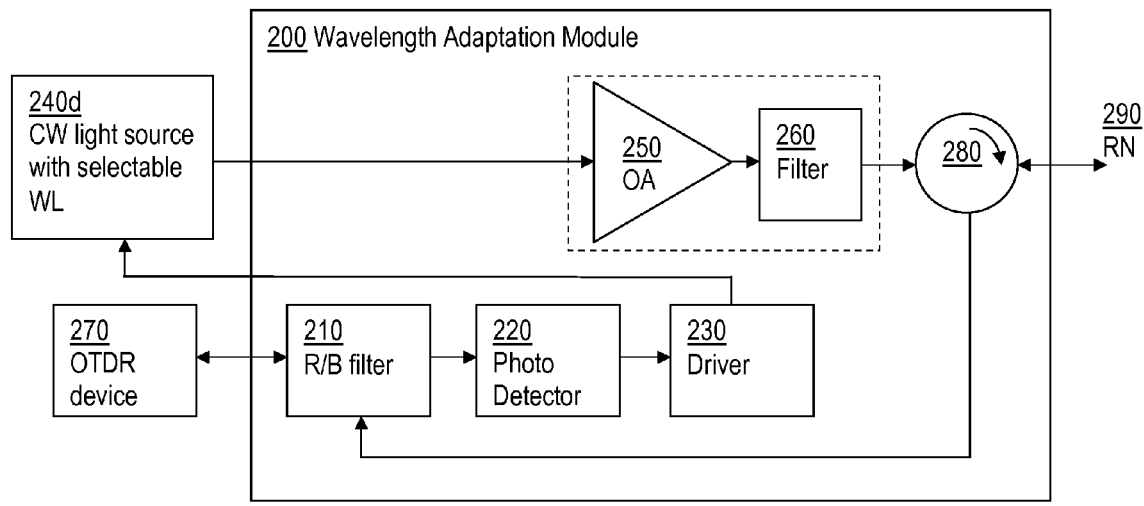

An exemplifying embodiment of such a Wavelength Adaptation Module will now be described with reference to FIG. 2a-2e. FIGS. 2a-2e are block diagrams schematically illustrating a Wavelength Adaptation Module configured to adapt or tune an OTDR signal for supervision of ONTs in a PON. FIG. 2a a schematic illustration of logical units adapted to perform the different functions of the exemplifying Wavelength Adaptation Module. FIGS. 2b-2d are examples of components which may be comprised in the exemplifying Wavelength Adaptation Module and different examples of implementation of these components.

The Wavelength Adaptation Module comprises the same objects and advantages as the method in the Wavelength Adaptation Module described above. The Wavelength Adaptation Module will be described in brief to avoid unnecessary repetition.

FIGS. 2a-2e illustrate the Wavelength Adaptation Module 200 being adapted to receive an OTDR signal comprising at least one wavelength and to Red/Blue, R/B, filter the received OTDR signal. The Wavelength Adaptation Module is further adapted to convert the filtered OTDR signal to a photoelectric current and to combine the photoelectric current with an optical signal having a pre-selected wavelength from a Continuous Wavelength light source. Still further, FIGS. 2a-2e illustrate the Wavelength Adaptation Module being adapted to amplitude modulate the combined photoelectric current and optical signal, thereby producing an amplitude modulated signal having the pre-selected wavelength of the optical signal, and to output the amplitude modulated signal towards a Remote Node, RN. The pre-selected wavelength of the optical signal has been pre-selected to enable a splitter in the RN to forward the amplitude modulated signal a dedicated group of ONTs in the PON, thereby supervising the fibre links between the RN and the dedicated group of ONTs.

FIGS. 2b-2e illustrate different exemplifying embodiments of the Wavelength Adaptation Module and these will be described in more detail below.

FIGS. 2b-2e illustrate the Wavelength Adaptation Module 200 receiving an OTDR signal from and OTDR device 270. The Wavelength Adaptation Module 200 also comprises an R/B-filter 210, in order to R/B-filter the received OTDR signal, and a photo detector 220 which is configured to convert the R/B-filtered signal to a photoelectric current.

FIG. 2b illustrates the Wavelength Adaptation Module 200 comprising a Continuous Wavelength light source with selectable wavelength 240b. In this example, the Continuous Wavelength light source with selectable wavelength 240b is configured to receive the photoelectric current and to combine the photoelectric current with an optical signal having a pre-selected wavelength generated by the Continuous Wavelength light source with selectable wavelength 240b. Still further, the Continuous Wavelength light source with selectable wavelength 240b is configured to amplitude modulate the optical signal with the combined photoelectric current. In this manner, the output from the Continuous Wavelength light source with selectable wavelength 240b constitutes a new OTDR signal having the pre-selected wavelength and also having other characteristics of an OTDR signal, e.g. specific amplitude, a specific energy and so on. The modulation may be performed in different ways. In an example, the modulation is performed by changing the laser optical output in a function of the photoelectric current. The function is in an example a linear function. This means that any change in current amplitude provided onto electrodes on a laser will result in direct change of the optical power transmitted from an output port of the laser.

FIG. 2c illustrates the Wavelength Adaptation Module 200 comprising a Continuous Wavelength light source with selectable wavelength 240c. In this example, the Continuous Wavelength light source with selectable wavelength 240c is configured to combine the photoelectric current with an optical signal having a pre-selected wavelength from the Continuous Wavelength light source with selectable wavelength 240c. Then the Wavelength Adaptation Module 200 comprises a separate amplitude modulator 245 configured to amplitude modulate the optical signal with the combined photoelectric current.

FIG. 2d illustrates the Wavelength Adaptation Module 200 being connected to a Continuous Wavelength light source with selectable wavelength 240d. In this example, the Continuous Wavelength light source with selectable wavelength 240d is configured to combine the photoelectric current with an optical signal having a pre-selected wavelength from the Continuous Wavelength light source with selectable wavelength 240d. Still further, the Continuous Wavelength light source with selectable wavelength 240d is configured to amplitude modulate the combined photoelectric current and optical signal. In this example, the Continuous Wavelength light source with selectable wavelength 240d is not incorporated into the Wavelength Adaptation Module 200 as is the case in FIGS. 2b and 2c. Instead, the Continuous Wavelength light source with selectable wavelength 240d is connected to the Wavelength Adaptation Module 200 so that it is still a part of the Wavelength Adaptation Module 200 but by connection instead of being built-in or incorporated. The functions performed by the Continuous Wavelength light source 240d corresponds to the functions of the Continuous Wavelength light source 240b described above. Thus, in the same manner, the output from the Continuous Wavelength light source with selectable wavelength 240d constitutes a new OTDR signal having the pre-selected wavelength and also having other characteristics of an OTDR signal, e.g. specific amplitude, a specific energy and so on. The modulation may be performed in different ways. In an example, the modulation is performed by changing the laser optical output in a function of the photoelectric current. The function is in an example a linear function. This means that any change in current amplitude provided onto electrodes on a laser will result in direct change of the optical power transmitted from an output port of the laser.

Figure 2E:
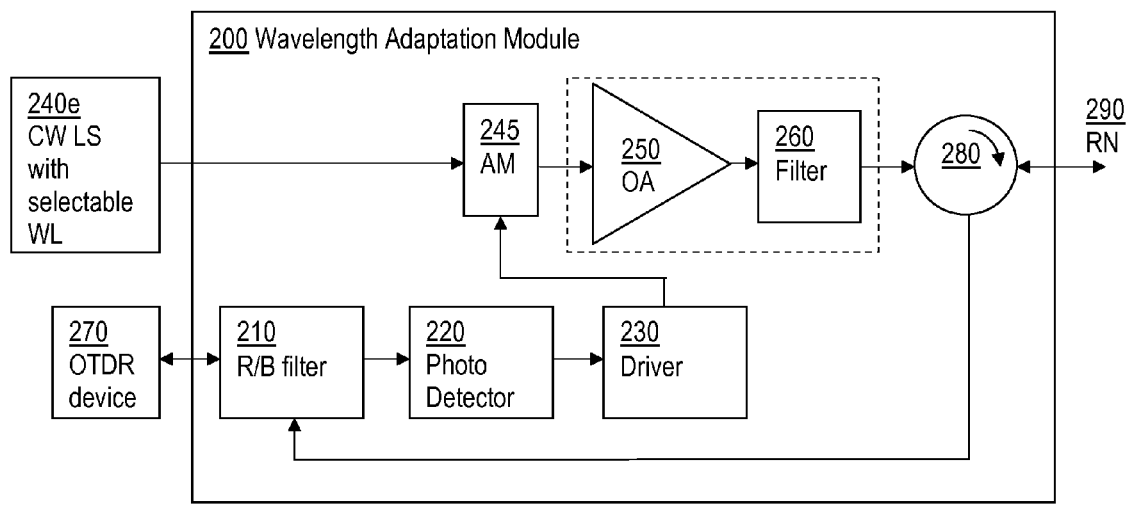

FIG. 2e illustrates the Wavelength Adaptation Module 200 being connected to a Continuous Wavelength light source with selectable wavelength 240e. In this example, the Continuous Wavelength light source with selectable wavelength 240e is configured to combine the photoelectric current with an optical signal having a pre-selected wavelength from the Continuous Wavelength light source with selectable wavelength 240e. Then the Wavelength Adaptation Module 200 comprises a separate amplitude modulator 245 configured to amplitude modulate the optical signal with the combined photoelectric current.

FIGS. 2b-2d all illustrate the Wavelength Adaptation Module 200 comprising a driver 230, which is arranged to receive the photoelectric current from the photo detector 220 and to output the photoelectric current either to the Continuous Wavelength light source 240b, 240d or to the Amplitude Modulator 245. The driver 230 is configured to adjust the electrical signal which drives the Continuous Wavelength light source 240b, 240d or the Amplitude Modulator 245. By adjusting is meant for example to amplify, and/or to add/extract a DC component, and/or to filter and so on.

According to an embodiment, the Wavelength Adaptation Module 200 is further adapted to optically amplify the amplitude modulated signal and to filter the optically amplified amplitude modulated signal before outputting the amplitude modulated signal towards the RN.

As described above, the amplitude modulated signal, in this example, is too week, possibly resulting in that it cannot be used to supervise and detect any possible fault events in fibre links from the RN to the ONTs. In such a case, the amplitude modulated signal is first amplified in order to be of a strength necessary to achieve reliable OTDR measurements of the fibre drop links from the RN to the ONTs. By amplifying the amplitude modulated signal also undesired noise may be either also amplified or introduced. In order to not send an OTDR signal having undesirable noise, the amplified OTDR signal having the pre-selected wavelength is filtered in order to obtain an amplified OTDR signal with minimal noise to then be outputted 160 towards the RN. This is illustrated in FIGS. 2b-2e by an optical amplifier 250 and a filter 260 being encompassed in a dotted rectangle. The dotted rectangle illustrates that these arrangements or devices are optional. In case the Continuous light source with selectable wavelengths 240b-240e can produce an optical signal having sufficient strength or power, there is no need to amplify and filter the signal, i.e. the OTDR signal having a pre-selected wavelength.

According to an embodiment, the Wavelength Adaptation Module 200 is further adapted to receive back-scattered light from the fibre links between the RN and the dedicated group of ONTs and to forward the back-scattered light to an OTDR device, thereby enabling analysis of the back-scattered light in order to detect any possible fault in any link between the RN and the dedicated group of ONTs.

In FIGS. 2b-2e, it is illustrated that the Wavelength Adaptation Module 200 comprises a circulator 280. The circulator is configured such that the amplitude modulated OTDR signal having a pre-selected wavelength being fed to the circulator 280 will be transmitted towards the RN 290. Further, received back-scattered light resulting from the amplitude modulated OTDR signal having a pre-selected wavelength will be fed to the circulator from the RN 290 and will be transmitted towards the R/B filter 210 which in turn is configured to just pass the back-scattered light through the R/B filter 210 and towards the OTDR device 270. Alternatively, the received back-scattered light resulting from the amplitude modulated OTDR signal having a pre-selected wavelength being fed to the circulator 280 from the RN 290 will be transmitted directly to the OTDR device 270 without passing through the R/B-filter 210.

According to an embodiment, the OTDR signal and the optical signal having a pre-selected wavelength are received as a result of an alarm issued by an ONT belonging to the dedicated group of ONTs, wherein the pre-selected wavelength of the received laser signal will enable the RN to forward the amplitude modulated signal to the dedicated group of ONTs.

According to still an embodiment, the optical signal is a laser signal.

According to yet an embodiment, the Wavelength Adaptation Module 200 is adapted to output the amplitude modulated signal towards the RN 290 by transmitting the amplitude modulated signal to the RN 290 on a dedicated fibre link, or on a feeder fibre link carrying data information from an Optical Line Terminal, OLT, to the RN.

The exemplified Wavelength Adaptation Module as described above is realisable in different ways. FIG. 2a illustrates a logical representation of different functional units of the exemplified Wavelength Adaptation Module. FIGS. 2b-2e illustrates for different examples of implementation of the functional units illustrated in FIG. 2a.

Embodiments herein also relate to a method in a Remote Node, RN, in a Passive Optical Network, PON, the PON comprising Optical Network Terminals ONTs and a Wavelength Adaptation Module arranged in the fibre path between an Optical Time Domain Reflectometry, OTDR, device and the RN, the RN comprising a passive splitter arrangement.

Such a method will now be described with reference to the flowchart of FIG. 4.

The method 400 comprises receiving 410 an amplitude modulated signal having a pre-selected wavelength from the Wavelength Adaptation Module, and outputting 420 the amplitude modulated signal to a dedicated group of ONTs with regards to the pre-selected wavelength of the received amplitude modulated signal.

The RN receives the amplitude modulated signal having a pre-selected wavelength from the Wavelength Adaptation Module, i.e. an OTDR signal having a pre-selected wavelength as having been described above. The wavelength is pre-selected such that the splitter arrangement of the RN forwards or switches the OTDR signal having a pre-selected wavelength to a dedicated group of ONTs, which group of ONTs is dedicated by means of the pre-selected wavelength. In other words, the splitter arrangement in the RN forwards or switches the OTDR signal to a specific group of ONTs with regards to the pre-selected wavelength. Just as an example, suppose the RN has 4 groups of ONTs connected to it. Then 4 different wavelengths of the OTDR signal are needed in order to supervise the 4 groups of ONTs. Hence, there are 4 different pre-selected wavelengths of the OTDR signals, or in other words, 4 different OTDR signals, each of a pre-selected wavelength.

According to an embodiment, the passive splitter arrangement comprises a multi-stage splitter and wherein the method comprises inserting the received amplitude modulated signal having a pre-selected wavelength after a first splitter stage of the multi-stage splitter.

Each splitter stage of a multi-stage splitter will introduce an attenuation of the amplitude modulated signal, i.e. the OTDR signal having a pre-selected wavelength. By inserting the OTDR signal having a pre-selected wavelength after a first splitter stage of the multi-stage splitter, the attenuation of the OTDR signal having a pre-selected wavelength is reduced. This has the effect that the OTDR signal having a pre-selected wavelength is stronger when being forwarded to the dedicated group of ONTs with regards to the pre-selected wavelength. This in turn has the effect that the measurement results from the back-scattered light of the amplitude modulated signal can be more precise and provide more information and more reliable information of the location and the severity of any possible detected fault.

According to an embodiment, a subsequent splitter stage of the multi-stage splitter, after the first splitter stage, outputs the amplitude modulated signal to the dedicated group of ONTs with regards to the pre-selected wavelength of the received amplitude modulated signal.

As explained above, since the amplitude modulated signal, i.e. the OTDR signal having a pre-selected wavelength, is inserted after a first splitter stage, a stronger OTDR signal having a pre-selected wavelength is outputted 420 to the dedicated group of ONTs with regards to the pre-selected wavelength of the received OTDR signal having a pre-selected wavelength.

According to an embodiment, the method further comprises receiving 420 the amplitude modulated signal together with a data information signal from an OLT and filtering out the amplitude modulated signal before inserting the amplitude modulated signal after the first splitter stage of the multistage splitter.

As having been explained above, the amplitude modulated signal, i.e. the OTDR signal having a pre-selected wavelength, is received in the RN either on a dedicated fibre link or on the feeder fibre link. In the example that the amplitude modulated signal is received on the feeder fibre, the amplitude modulated signal is received together with a data information signal from an OLT. The data information signal will pass through the whole multistage splitter, in other words, the data information signal is inserted or injected into the first splitter stage of the multi-stage splitter. Also as explained above, in an embodiment, the amplitude modulated signal, i.e. the OTDR signal having a pre-selected wavelength, is inserted into the multi-stage splitter after the first splitter stage. This means that the amplitude modulated signal needs to be filtered out or separated from the data information signal so that the data information signal can be inserted into the first splitter stage and the OTDR signal having a pre-selected wavelength can be inserted after the first splitter stage of the multi-stage splitter. The amplitude modulated signal has a pre-selected wavelength in order to be forwarded to a dedicated group of ONTs with regards to the pre-selected wavelength. It shall be pointed out that any pre-selected wavelength of the amplitude modulated signal differs from any wavelength comprised in the data information signal such that the amplitude modulated signal can be easily filtered out when received on the feeder fibre link, and such that a OTDR measuring procedure does not interfere with data communication.

Embodiments herein also relate to a Remote Node, RN, in a Passive Optical Network, PON, the PON comprising Optical Network Terminals ONTs and a Wavelength Adaptation Module arranged in the fibre path between an Optical Time Domain Reflectometry, OTDR device and the RN, the RN comprising a passive splitter arrangement.

Such a remote Node will now be described with references to FIGS. 5a and 5b.

The RN has the same objects and advantages as the method performed in the RN and hence the RN will be described in brief to avoid unnecessary repetition.

The RN is adapted to receive an amplitude modulated signal having a pre-selected wavelength from the Wavelength Adaptation Module, and to output the amplitude modulated signal to a dedicated group of ONTs with regards to the pre-selected wavelength of the received amplitude modulated signal.

According to an embodiment, the passive splitter arrangement comprises a multi-stage splitter and wherein the RN is adapted to insert the received amplitude modulated signal having a pre-selected wavelength after a first splitter stage of the multi-stage splitter.

According to an embodiment, a subsequent splitter stage of the multi-stage splitter, after the first splitter stage, is adapted to output the amplitude modulated signal to the dedicated group of ONTs with regards to the pre-selected wavelength of the received amplitude modulated signal.

According to still an embodiment, the RN is further adapted to receive the amplitude modulated signal together with a data information signal from an OLT and to filter out the amplitude modulated signal before inserting the amplitude modulated signal after the first splitter stage of the multistage splitter.

According to yet an embodiment, the RN is further adapted to receive the amplitude modulated signal having a pre-selected wavelength from the Wavelength Adaptation Module on a dedicated fibre link, wherein the RN further is adapted to transmit the amplitude modulated signal also on a feeder fibre link between an Optical Line Terminal, OLT, and the RN.

In an example, the RN transmits or forwards the amplitude modulated signal having a pre-selected wavelength received on a dedicated fibre link either to the dedicated group of ONTs or on the feeder fibre link between an Optical Line Terminal, OLT, and the RN. This enables supervision of the feeder fibre link between the RN and the OLT as well as the drop links between the RN and the ONTs. In this example, a specific value of the pre-selected wavelength is required for the RN to forward the modulated signal having a pre-selected wavelength to the OLT on the feeder fibre link.

Figure 5A:
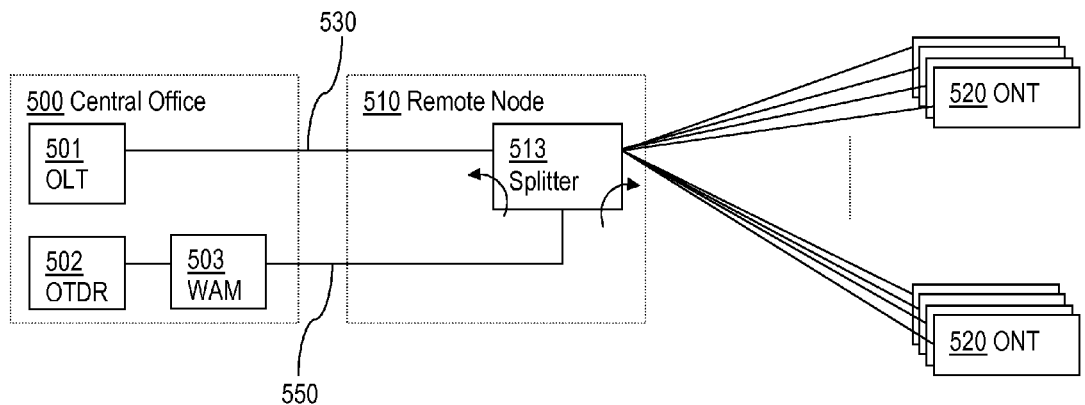
FIGS. 5a and 5b are block diagrams schematically illustrating two different examples of transmission of an amplitude modulated signal from a Wavelength Adaptation Module to a Remote Node.
Figure 5B:
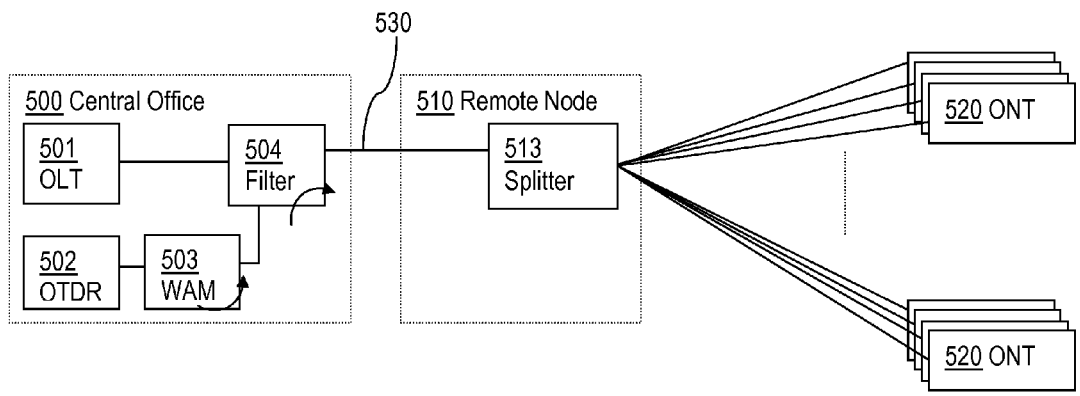

FIGS. 5a and 5b are block diagrams schematically illustrating two different examples of transmission of an amplitude modulated signal from a Wavelength Adaptation Module to a Remote Node.

Both FIGS. 5a and 5b illustrate a Passive Optical Network, PON, comprising a Central Office, CO 500. A Remote Node, RN 510 and a plurality of groups of ONTs 520. In this example, only two groups of ONTs 520 are actually shown, but a dotted line is present in both figures to illustrate that there may be more than two groups of ONTs. Also, each group of ONTs 520 is illustrated having four ONTs 520. It shall be noted that this is merely an example and the reason for the limited number of groups of ONTs and number of ONTs 520 in each group illustrated in FIGS. 5a and 5b is to make the figures clear and to illustrate different embodiments of a PON being provided with a Wavelength Adaptation Module 503.

FIG. 5a illustrates the CO 500 comprising an OLT 501 and an OTDR device 302. Further a Wavelength Adaptation Module (WAM) 503 is provided in the CO 500. The Wavelength Adaptation Module 503 is arranged such that it receives as input OTDR signals transmitted from the OTDR device 302. As explained above, the Wavelength Adaptation Module 503 adapts or tunes the wavelengths of a received OTDR to a pre-selected wavelength, this OTDR signal having a pre-selected wavelength is also referred to above as an amplitude modulated signal having the pre-selected wavelength. In FIG. 5a, the OTDR signal having a pre-selected wavelength is transmitted to the RN 510 using a dedicated fibre link 550. In the RN 510, a splitter arrangement 513 receives the OTDR signal having a pre-selected wavelength on the dedicated fibre link 550 and forwards the OTDR signal having a pre-selected wavelength to a dedicated group of ONTs 520 in relation to the pre-selected wavelength. Further, the splitter arrangement 513 is configured to forward the OTDR signal having a pre-selected wavelength towards the OLT 501 on a feeder fibre link 530 in order to support supervision of the feeder fibre link 530.

The example illustrated in FIG. 5b differs from the example illustrated in FIG. 5a in that the CO 500 is provided with a filter 504. The OTDR signal having a pre-selected wavelength from the Wavelength Adaptation Module 503 is inserted into the filter 504 and also a data information signal from the OLT 501 is inserted into the filter 504. The filter 504 forwards both the OTDR signal having a pre-selected wavelength from the Wavelength Adaptation Module 503 and the data information signal from the OLT 501 to the RN 510 on the feeder fibre link 530. This example also provides supervision of the feeder fibre link 530 since the OTDR signal having a pre-selected wavelength being transmitted on the feeder fibre link 530 towards the RN 510 will result in back-scattered light along the feeder fibre link 530 which can be analysed and processed in order to detect, to locate and to determine the severity of any possible fault along the feeder fibre link 530.

In the RN 510, the splitter arrangement 513 is configured to forward the data information signal to an ONT or ONTs to which the data information signal is destined. Also the splitter arrangement 513 is configured to forward the OTDR signal having a pre-selected wavelength to a dedicated group of ONTs with regards to the pre-selected wavelength.

As having been described above, based on the pre-selected wavelength, the OTDR signal having the pre-selected wavelength reaches a dedicated group of ONTs or drop links between the RN and the dedicated group of ONTs. In case all groups are to be supervised, a first OTDR signal having a first pre-selected wavelength is directed to a first group of ONTs, then a second OTDR signal having a second pre-selected wavelength is directed to a second group of ONTs and so on until all groups of ONTs have been supervised. In order to direct the OTDR signals having respective pre-selected wavelengths, the RN is provided with a dedicated set of passive R/B-filters or a single Wavelength Division Multiplex (WDM) filter is installed in the RN. This will be explained in more detail below. The filter(s) in the RN is in an example enclosed in a separate connectable module and the splitter arrangement is a separate unit or device. In another example, the filter(s) are photonically integrated with the splitter arrangement. In both examples, the RN will be completely passive, meaning it will not contain any expensive active components.

According to an example, a group of ONTs comprises 8 ONTs. In this example, one pre-selected wavelength can be used to measure the 8 drop fibre links between the RN and the 8 ONTs in the group. It shall be pointed out, that even though the examples herein illustrates a group of ONTs comprising 8 ONTs, a group of ONTs may comprise fewer or more ONTs than 8.

The supervision of the PON is in an example performed as a result of an ONT in a group of ONTs issuing an alarm of some kind as explained above, as a result of detecting a fault such as a drop in received optical power, loss of signal or high error rate in the received signal. Also Optical Transceiver Monitoring (OTM) is used, which provides measurable parameters. The supervision of the PON is in another example performed at regular time intervals regardless of having received any alarm from any ONT comprised in the PON.

The PON comprises in an example a centralised control unit (not shown in the figures). The centralised control unit is responsible for receiving a potential alarm, issuing an order to supervise a group of ONTs in the PON and to select the wavelength of the Continuous Wavelength light source so that the wavelengths of the OTDR signal from the OTDR device is adapted to the wavelength of the Continuous Wavelength light source such that a dedicated group of ONTs is supervised in relation to the pre-selected wavelength. The centralised control unit in this example is also adapted to collect measured parameters from the OTDR device and optionally from the OLT and perform analysis on the measured parameters. The control unit is in an example adapted to collect measured parameters from a plurality of individual PONS. Example of parameters that may be measured by using combined OTDR and OTM techniques are: received optical power levels, discrete and cumulative losses and reflectances.

Due to the Optical-Electrical-Optical (O-E-O) conversion in the Wavelength Adaptation Module, time-synchronisation may be needed for accurate plotting of a reflectogram as a result of back-scattered light. This is achieved in an example by applying a time-delay factor after obtaining the raw data from the OTDR device. As the OTDR signal travels through the optical routes, i.e. the different drop links between the RN and the ONTs, and optionally also the feeder fibre link, the OTDR signal back-scatters. The returned portions of the sent out OTDR signal power reaches the OTDR device. The information on the received power can then be matched together with information on time of the sending out of the OTDR signal and received instances and then plotted on an OTDR loss-distance trace.

As have been described above, the supervision or the OTDR measurement is performed periodically or on-demand. The on-demand may be triggered by the received of an alarm from an ONT or manually. Once the back-scattered OTDR signal is received at the OTDR device and the analysis of the OTDR trace is performed, information on an OTDR-event type and magnitude is obtained. Such events are compared to reference data and if a violation threshold is reached, the OTDR results are mapped with OTM reports. Further on, faulty drop links are marked and a complete localisation, including distance from the RN, is reported together with assigned type and magnitude of the faults. The measured data is in an example further stored in a database, where they can be referred to at any time. All this can be performed or handled by the above described control unit.

In an example, the optical signal from the Continuous Wavelength light sources comprises more than just one pre-selected wavelength. In such an example, an optical filter is provided in the Wavelength Adaptation Module adapted to optically filter either the received optical signal before combining the optical signal with the photocurrent from the photo detector, or to optically filter the combined optical signal and the photocurrent from the photo detector before amplitude modulating the combined optical signal and the photocurrent. Alternatively, the optical filter is adapted to optically filter the amplitude modulated signal before transmitting it towards the remote node. The optical filtering is performed such that all wavelengths are filtered out except the pre-selected wavelength. Looking at FIGS. 2a-2d, such an optical filter can be arranged in different places in the Wavelength Adaptation Module depending on in what "stage" of the adaptation of the received OTDR signal the optical filtering is to take place. The optical filter is in a first example incorporated within the Continuous Wavelength light source 240b-240e. In a second example, the optical filter is arranged between the Continuous Wavelength light source 240b-240e and the circulator 280. In a third example the optical filter is arranged either between the optical amplifier 250 and the filter 260 or the optical filter is incorporated into the filter 260.

The described embodiments of the Wavelength Adaptation Module and the respective method therein can be employed in different kinds of PONS. Some different exemplifying architectures of PONS will now be described in which the above described embodiments can be implemented. This will be done with reference to FIGS. 6a-14b.

Figure 6A:
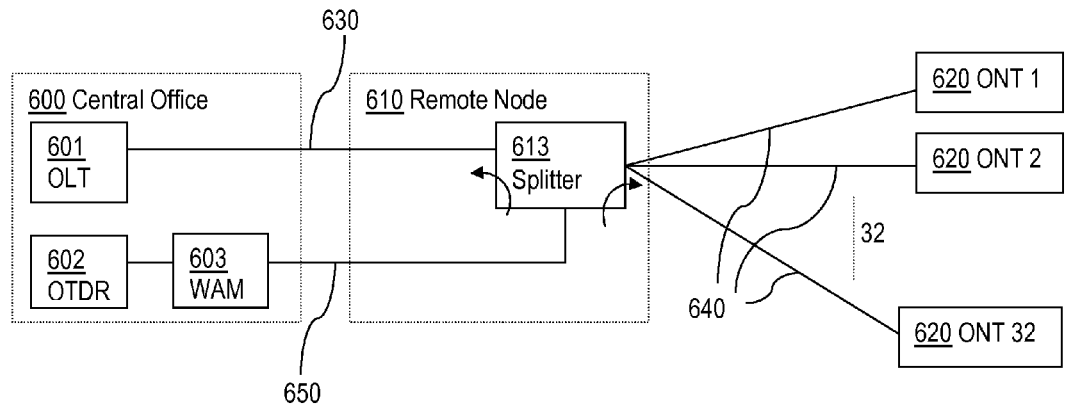
FIG. 6a is a block diagram of an exemplifying embodiment of a PON, in which a Wavelength Adaptation Module is employed.

FIG. 6a is a block diagram of an exemplifying embodiment of a PON, in which a Wavelength Adaptation Module is employed. In this exemplifying illustration of a PON, a Central Office 600 comprises an OLT 601, an OTDR device 602 and a Wavelength Adaptation Module 603. The OTDR signal having a pre-selected wavelength is transmitted from the Wavelength Adaptation Module 603 to an RN 610 on a dedicated fibre link 650. The RN 610 comprises a 2*32 splitter arrangement 613 and the splitter arrangement 613 is adapted to forward the received OTDR signal having a pre-selected wavelength either to 32 ONTs 620 on drop links 640 or to the OLT 601 on a feeder fibre link 630, depending on the pre-selected wavelength. In this example, the RN 610 has 4 groups of 8 ONTs connected to it, namely the 32 ONTs 620.

Figure 6B:
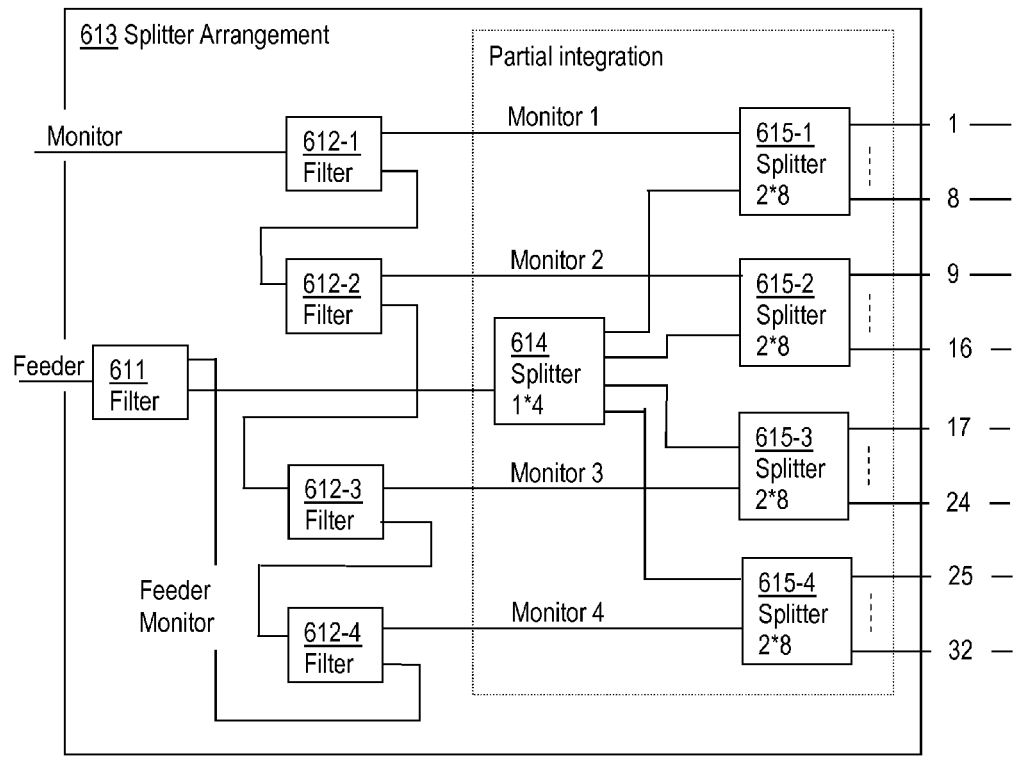
FIG. 6b is a block diagram illustrating an exemplifying splitter arrangement in a Remote Node.

FIG. 6b is a block diagram illustrating an exemplifying splitter arrangement in a Remote Node in accordance with the shown illustration of the PON in FIG. 6a.

A feeder fibre is connected to a filter 611, which is configured to forward a received data information signal from the OLT 601 to a 1*4 splitter 614 constituting a first splitter stage. The dedicated fibre link, on which an OTDR signal having a pre-selected wavelength is received, is connected to a first filter 612-1 which is configured to forward the OTDR signal having a pre-selected wavelength to a first 2*8 splitter 615-1 in case the pre-selected wavelength has a first value. This is illustrated by "Monitor 1". The first 2*8 splitter 615-1 is connected to a first group of 8 ONTs. If the pre-selected wavelength does not correspond to the first value, then the first filter 612-1 is configured to forward the OTDR signal having the pre-selected wavelength to a second filter 612-2.

The second filter 612-2 is configured to forward the OTDR signal having a pre-selected wavelength to a second 2*8 splitter 615-2 in case the pre-selected wavelength has a second value. This is illustrated by "Monitor 2". The second 2*8 splitter 615-2 is connected to a second group of 8 ONTs. If the pre-selected wavelength does not correspond to the second value, then the second filter 612-2 is configured to forward the OTDR signal having the pre-selected wavelength to a third filter 612-3.

The third filter 612-3 is configured to forward the OTDR signal having a pre-selected wavelength to a third 2*8 splitter 615-3 in case the pre-selected wavelength has a third value. This is illustrated by "Monitor 3". The third 2*8 splitter 615-3 is connected to a third group of 8 ONTs. If the pre-selected wavelength does not correspond to the third value, then the third filter 612-3 is configured to forward the OTDR signal having the pre-selected wavelength to a fourth filter 612-4.

The fourth filter 612-4 is configured to forward the OTDR signal having the pre-selected wavelength to a fourth 2*8 splitter 615-4 in case the pre-selected wavelength has a fourth value. This is illustrated by "Monitor 4". The fourth 2*8 splitter 615-4 is connected to a fourth group of 8 ONTs. The fourth filter 612-4 is also configured to forward the OTDR signal having the pre-selected wavelength to the filter 611, in case the pre-selected wavelength corresponds to a fifth value, so that the OTDR signal can be forwarded to the OLT on the feeder fibre link, thereby enabling supervision of also the feeder fibre link. If the pre-selected wavelength does not correspond to the fourth or the fifth value, then the fourth filter 612-4 is configured to discard the OTDR signal having the pre-selected wavelength.

All four 2*8 splitters 615-1 to 615-4 constitute a last splitter stage in this example.

Figure 6C:
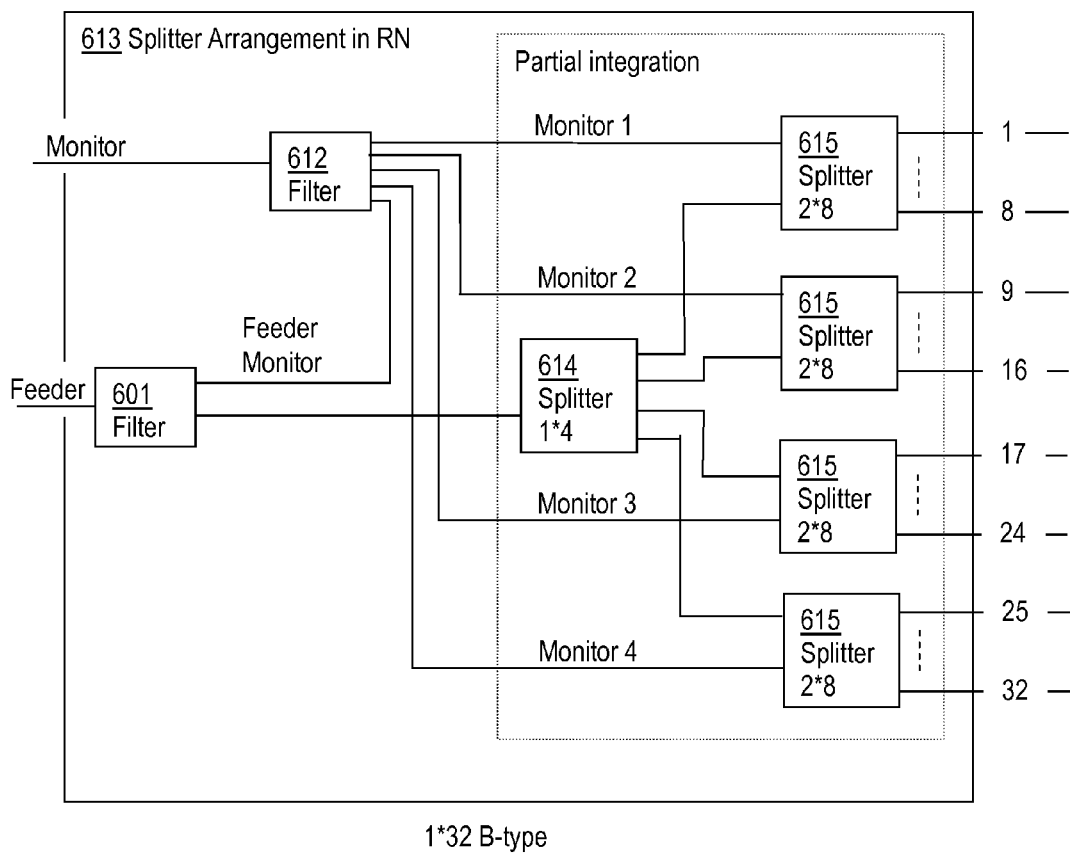
FIG. 6c is a block diagram illustrating another exemplifying splitter arrangement in a Remote Node.

FIG. 6c is a block diagram illustrating another exemplifying splitter arrangement in a Remote Node in accordance with the shown illustration of the PON in FIG. 6a.

In this example, the RN 610 comprises a single filter 612 which is arranged to perform the same functions as was described above for the four filters 612-1 to 612-4.

Figure 7A:
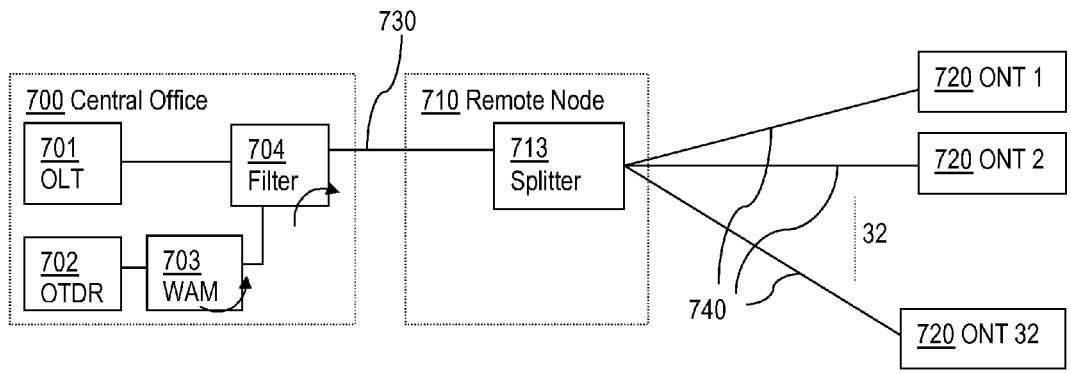
FIG. 7a is a block diagram of yet an exemplifying embodiment of a PON, in which a Wavelength Adaptation Module is employed.

FIG. 7a is a block diagram of still an exemplifying embodiment of a PON, in which a Wavelength Adaptation Module is employed. In this exemplifying illustration of a PON, a Central Office 700 comprises an OLT 701, an OTDR device 702 and a Wavelength Adaptation Module 703. The OTDR signal having a pre-selected wavelength is transmitted to an RN 710 on feeder fibre link 730. The Central Office 700 is provided with a filter 704 arranged to forward both a data information signal from the OLT 701 and an OTDR signal having a pre-selected wavelength to the RN 710 on the feeder fibre link 730. The RN 710 comprises a 1*32 splitter arrangement 713 and the splitter arrangement 713 is adapted to forward the received OTDR signal having a pre-selected wavelength to 32 ONTs 720 on drop links 740. In this example, the RN 710 has 4 groups of 8 ONTs connected to it, namely the 32 ONTs 720.

Figure 7B:
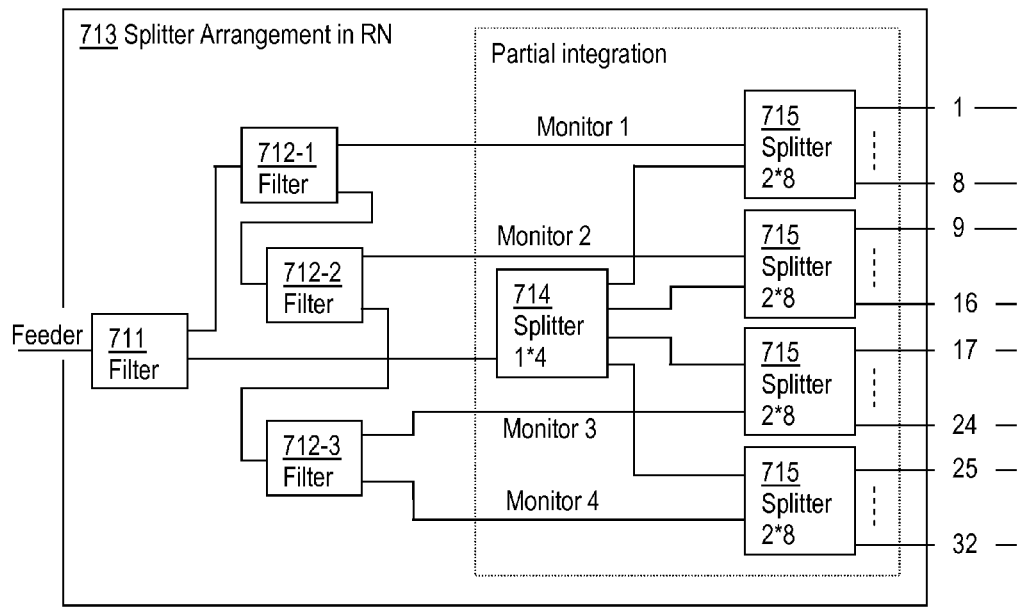
FIG. 7b is a block diagram illustrating an exemplifying splitter arrangement in a Remote Node.

FIG. 7b is a block diagram illustrating an exemplifying splitter arrangement in a Remote Node in accordance with the shown illustration of the PON in FIG. 7a.

This exemplifying splitter arrangement 713 in a Remote Node 710 differs from the exemplifying splitter arrangement illustrated in FIG. 6a in that the filter 711 filters and separates the OTDR signal having the pre-selected wavelength from the data information signal. The data information signal is forwarded to a first 1*4 splitter 714 constituting a first splitter stage. The OTDR signal having the pre-selected wavelength is then forwarded to a first filter 712-1 corresponding in function to the previously described filter 612-1. The same is true for a second filter 712-2. A third filter 712-3 is arranged to forward the OTDR signal having the pre-selected wavelength to a third 2*8 splitter 715 if the pre-selected wavelength corresponds to a third value and to forward the OTDR signal having the pre-selected wavelength to a fourth 2*8 splitter 715 if the pre-selected wavelength corresponds to a fourth value.

Figure 7C:
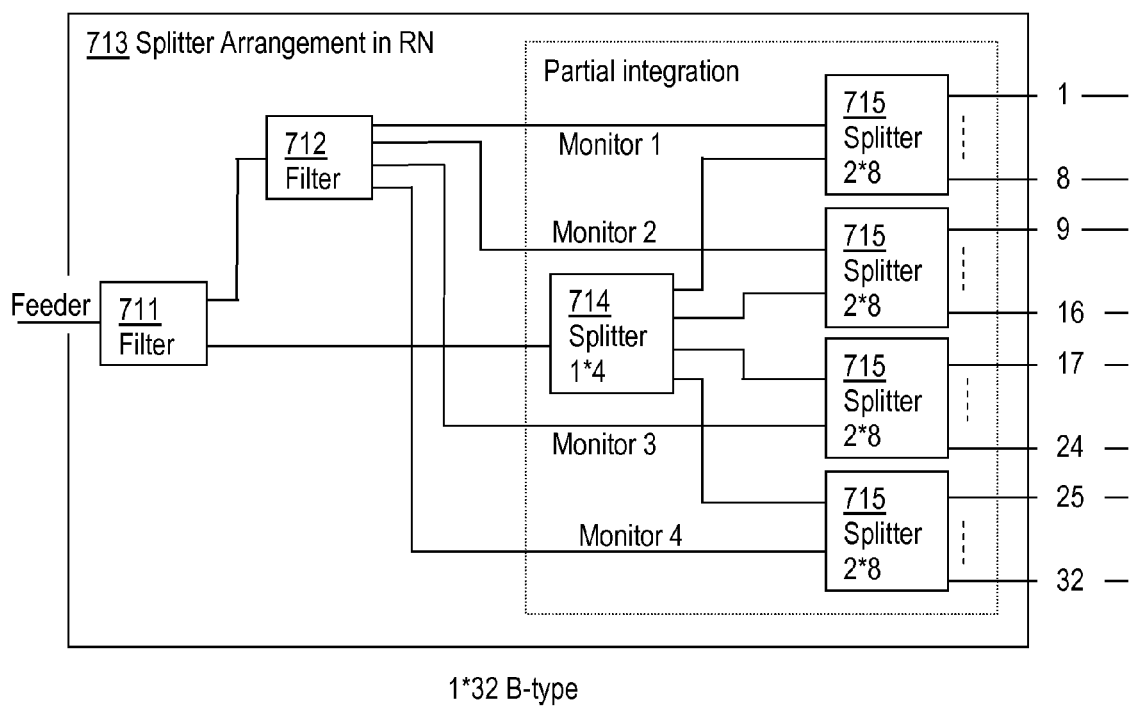
FIG. 7c is a block diagram illustrating another exemplifying splitter arrangement in a Remote Node.

FIG. 7c is a block diagram illustrating another exemplifying splitter arrangement 713 in a Remote Node 710 in accordance with the shown illustration of the PON in FIG. 7a.

In this example, the RN 710 comprises a single filter 712 which is arranged to perform the same functions as was described above for the three filters 712-1 to 712-3.

Figure 4:
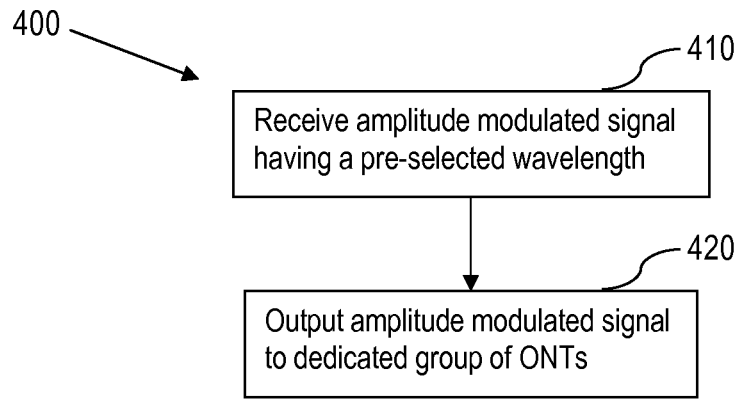
FIG. 4 is a flowchart of an exemplifying embodiment of a method in a remote Node, RN.

In both FIGS. 7b and 7c, 4 different monitoring or supervision fibre links are illustrated being inputted from a filter 712 to a 2*8 splitter 715. This example illustrates that 4 different pre-selected wavelengths are required in order to supervise 32 ONTs. It can be seen that each monitoring or supervision fibre link is connected to 8 ONTs. In this example, a group of ONTs comprises 8 ONTs.

Figure 8A:
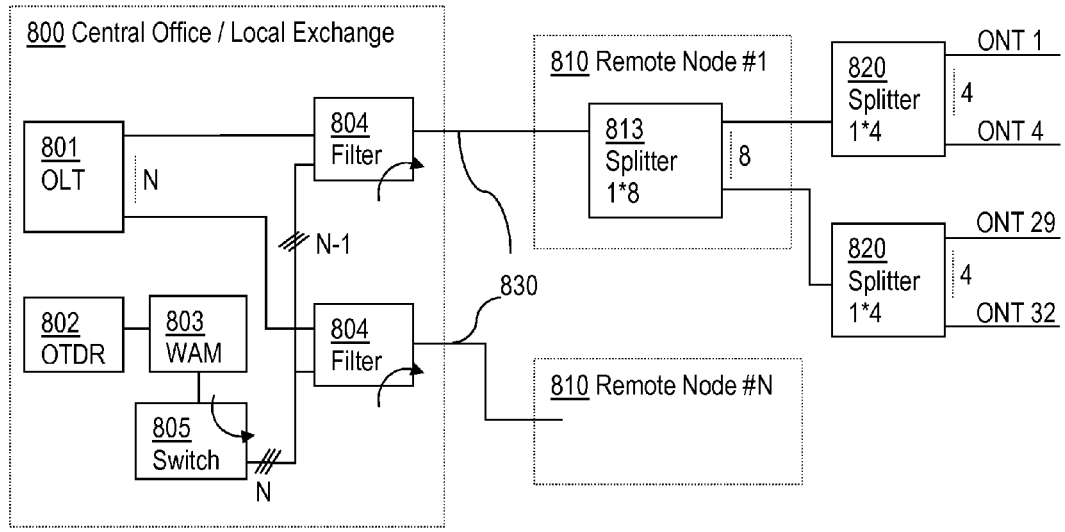
FIG. 8a is a block diagram of yet an exemplifying embodiment of a PON, in which a Wavelength Adaptation Module is employed.

FIG. 8a is a block diagram of an exemplifying embodiment of a PON, in which a Wavelength Adaptation Module is employed. The architecture illustrated in FIG. 8a is N*32 (00/08/04) with a common feeder fibre link for both a data information signal and a OTDR signal having a pre-selected wavelength.

In this exemplifying illustration of a PON, a Central Office 800 comprises an OLT 801, an OTDR device 802 and a Wavelength Adaptation Module 803. The OTDR signal having a pre-selected wavelength is transmitted from the Wavelength Adaptation Module 803 to an RN 810 on a feeder fibre link. The OLT 801 is connected to N different RNs by N different feeder fibre links 830. The Central Office 800 is also provided with a switch 805 having one input connected to the Wavelength Adaptation Module 803 and N outputs connected to N separate filters 804 for inserting the OTDR signal having a pre-selected wavelength, as well as a data information signal from the OLT 801, into the respective N feeder fibres 830.

The RN 610 comprises a 1*8 splitter arrangement 813 and the splitter arrangement 813 is adapted to forward the received OTDR signal having a pre-selected wavelength on 8 fibre links towards 8 different 1*4 splitters 820. In this example, the splitter arrangement 813 in the RN 810 has 8 outgoing fibre links, each connected to 4 ONTs by means of the 1*4 splitter 820.

Figure 8B:
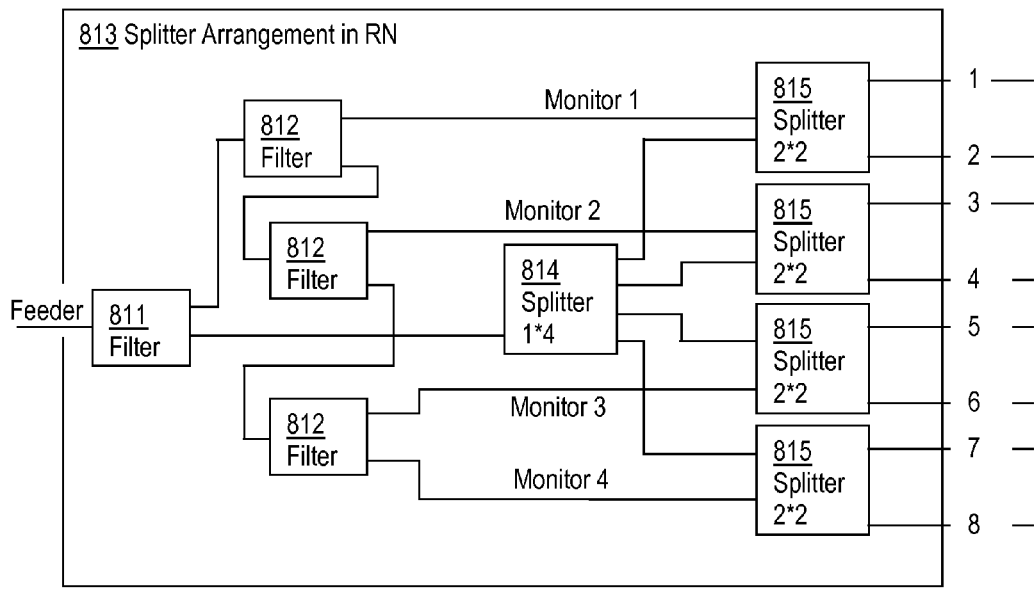
FIG. 8b is a block diagram illustrating an exemplifying splitter arrangement in a Remote Node.

FIG. 8b is a block diagram illustrating an exemplifying splitter arrangement 813 in a Remote Node 810 in accordance with the shown illustration of the PON in FIG. 8a. This splitter arrangement has the same functions as was described for the splitter arrangement illustrated in FIG. 7b. The splitter arrangement illustrated in FIG. 8b differs only in the last splitter stage comprising 4 different 2*2 splitters, resulting in the multistage splitter being a 1*8 multistage splitter. In this example, 4 different monitoring or supervision fibre links are illustrated being inputted from a filter 812 to a 2*2 splitter. This example illustrates that 4 different pre-selected wavelengths are required in order to supervise 8 output links of the RN 810. Looking at FIG. 8a, each fibre link of the 1*8 splitter is connected to a 1*4 splitter 820. Looking at FIGS. 8a and 8b together, it can be seen that one "monitor fibre link", e.g. Monitor 1 is forwarded to two fibre links (1 and 2) in FIG. 8b. Looking at FIG. 8a, a single fibre link is connected to a 1*4 splitter and, consequently, to 4 ONTs. Since Monitor 1 if forwarded to two fibre links, Monitor 1 is forwarded to 8 ONTs (2*4). Hence a group of ONTs that can be measured by a single pre-selected wavelength of the OTDR signal comprises 8 ONTs.

Figure 9A:
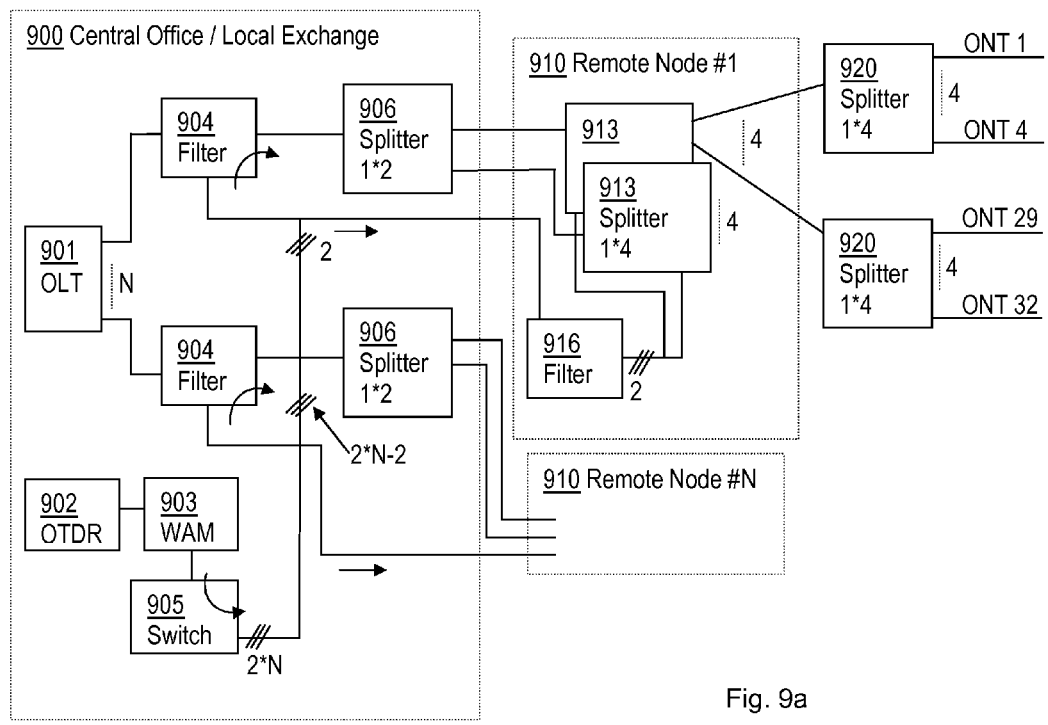
FIG. 9a is a block diagram of yet an exemplifying embodiment of a PON, in which a Wavelength Adaptation Module is employed.

FIG. 9a is a block diagram of an exemplifying embodiment of a PON, in which a Wavelength Adaptation Module is employed. The architecture illustrated in FIG. 9a is N*32 (02/04/04) with a dedicated fibre link for the OTDR signal having a pre-selected wavelength.

In this exemplifying illustration of a PON, a Central Office 900 comprises an OLT 901, an OTDR device 902 and a Wavelength Adaptation Module 903. The OLT 901 is connected to N different RNs by N different feeder fibre links. The Central Office 900 is also provided with a switch 905 having one input which is connected to the Wavelength Adaptation Module 903 and 2*N outputs. N outputs of the 2*N outputs are connected to a respective input of N separate filters 904. The other N outputs of the switch 905 are connected to a respective dedicated feeder fibre. The Central Office 900 is also provided with N 1*2 splitters 906.

Each of the N Remote Nodes 910 comprises a filter 916 having one input for receiving the OTDR signal having a preselected wavelength and two outputs. Each of the two outputs of the filter 914 is connected to a respective 1*4 splitter arrangement 913. Each respective 1*4 splitter arrangement 913 is connected to the feeder fibre carrying data information signals from the OLT 901. Further, each of the 1*4 splitter arrangements 913 is connected to 4 different 1-4 splitters 920.

Figure 9B:
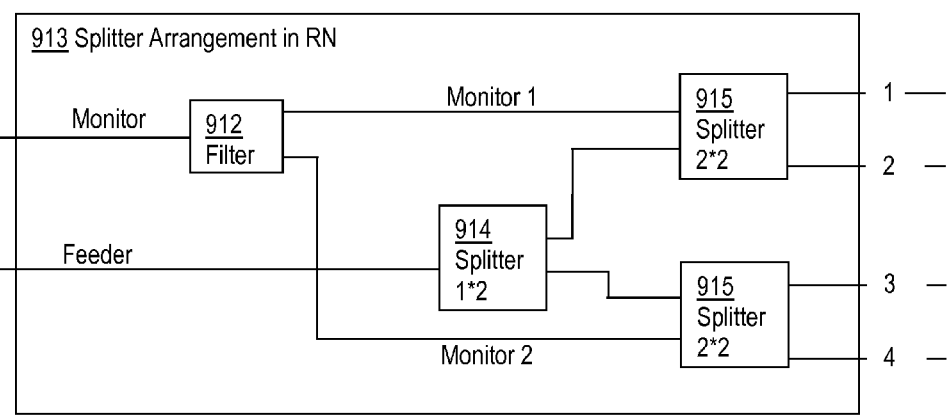
FIG. 9b is a block diagram illustrating an exemplifying splitter arrangement in a Remote Node.

FIG. 9b is a block diagram illustrating an exemplifying splitter arrangement 913 in a Remote Node 910 in accordance with the shown illustration of the PON in FIG. 9a. This splitter arrangement 913 comprises a first 1*2 splitter stage 914 having an input connected to the feeder fibre and two outputs. Each of these two outputs is connected to an input of a respective second 2*2 splitter 915. The respective second input of the second 2*2 splitters 915 is connected to an output of a filter 912 which is arranged to receive the OTDR signal having a preselected wavelength on a dedicated fibre link. The filter 912 is configured in the same manner as filter 712-3 described in relation to FIG. 7b. In this example, there are two "monitor fibre links" from the filter 912 to the two 2*2 splitters 915. As in FIG. 8b, one "monitor fibre links", e.g. Monitor 1 is forwarded to two fibre links (1 and 2) after the top splitter 915 in FIG. 9b. As for FIG. 8b, each fibre link is connected to a 1*4 splitter and, consequently, 4 ONTs. In the same manner as described in relation with FIG. 8b, a group of ONTs that can be supervised or monitored by one specific pre-selected wavelength comprises 8 ONTs.

Figure 10A:
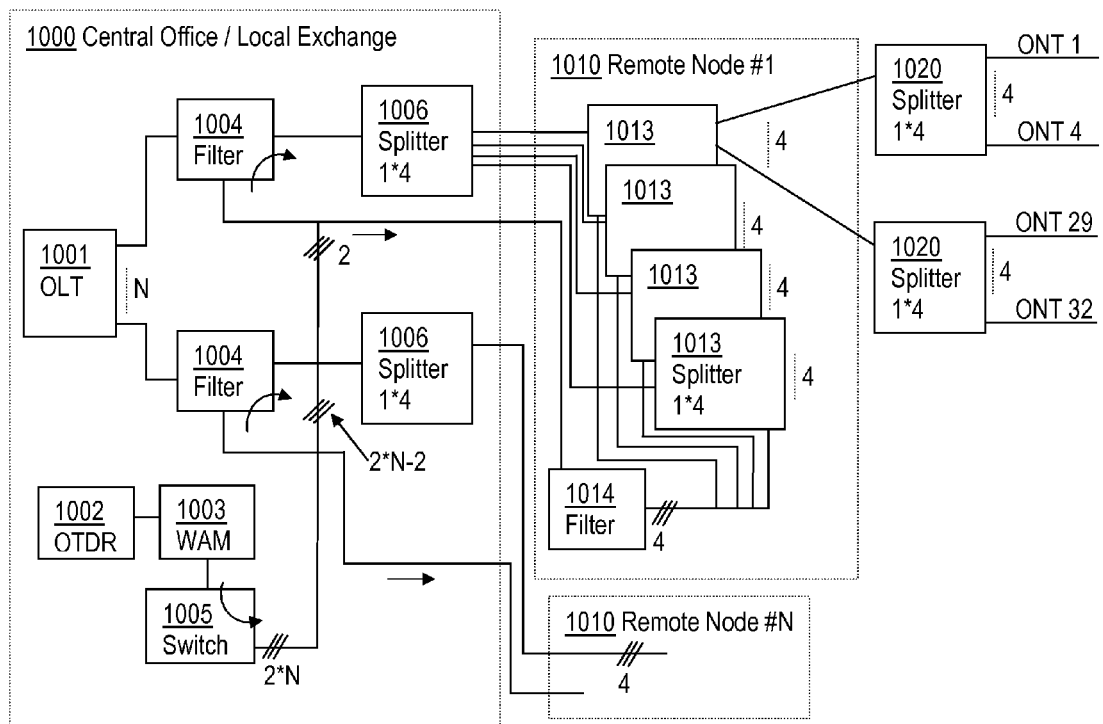
FIG. 10a is a block diagram of yet an exemplifying embodiment of a PON, in which a Wavelength Adaptation Module is employed.

FIG. 10a is a block diagram of an exemplifying embodiment of a PON, in which a Wavelength Adaptation Module is employed. The architecture illustrated in FIG. 10a is N*64 (04/04/04) with a dedicated fibre link for the OTDR signal having a pre-selected wavelength.

FIG. 10a differs from FIG. 9a in that the remote node 1010 comprises four different 1*4 splitters 1013 instead of two.

Figure 10B:
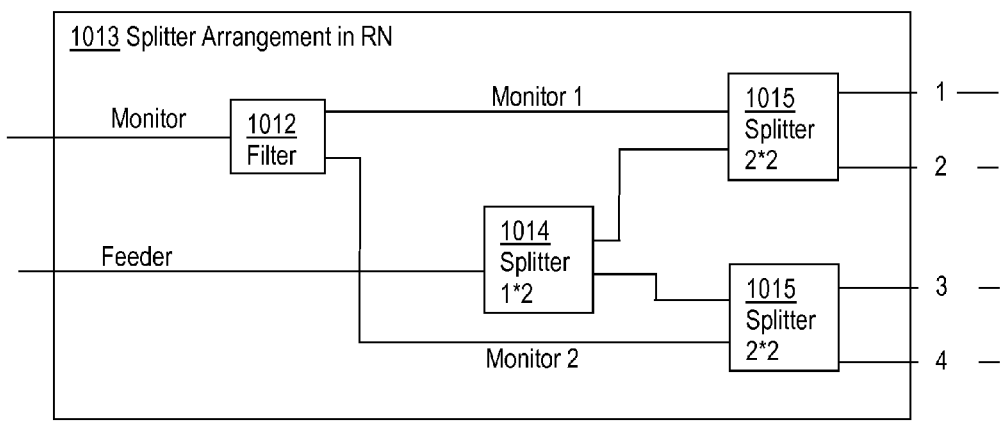
FIG. 10b is a block diagram illustrating an exemplifying splitter arrangement in a Remote Node.

FIG. 10b is similar to FIG. 9b as the 1*4 splitter arrangement 1013 corresponds to the 1*4 splitter arrangement 913. Also in this example, a group of ONTs that can be supervised or monitored by one specific pre-selected wavelength comprises 8 ONTs, as was described in relation to FIGS. 8b and 9b.

Figure 11A:
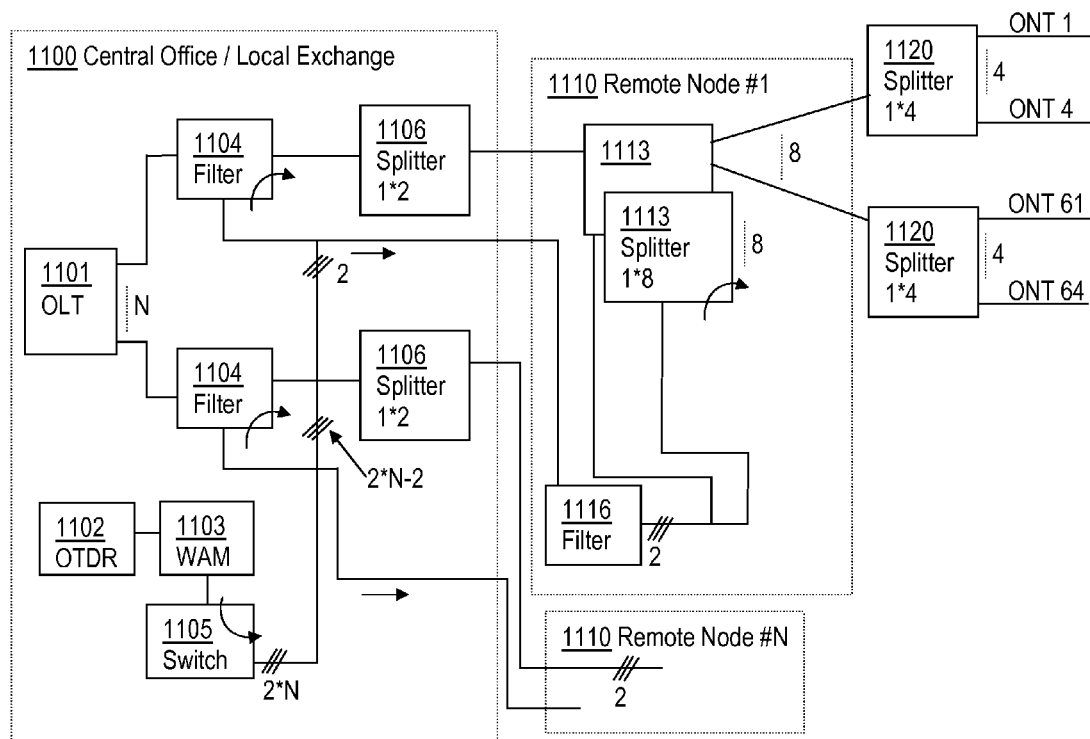
FIG. 11a is a block diagram of yet an exemplifying embodiment of a PON, in which a Wavelength Adaptation Module is employed.

FIG. 11a is a block diagram of an exemplifying embodiment of a PON, in which a Wavelength Adaptation Module is employed. The architecture illustrated in FIG. 11a is N*64 (02/08/04) with a dedicated fibre link for the OTDR signal having a pre-selected wavelength.

FIG. 11a differs from FIG. 9a in that each of the N Remote Nodes 1110 comprises two 1*8 splitter arrangements 1113. Each of the 8 outputs from each of the two 1*8 splitter arrangements 1113 are connected to the input of a 1*4 splitter 1120. In this example, the RN 1110 is connected to 16 groups of ONTs, each group comprising 4 ONTs.

Figure 11B:
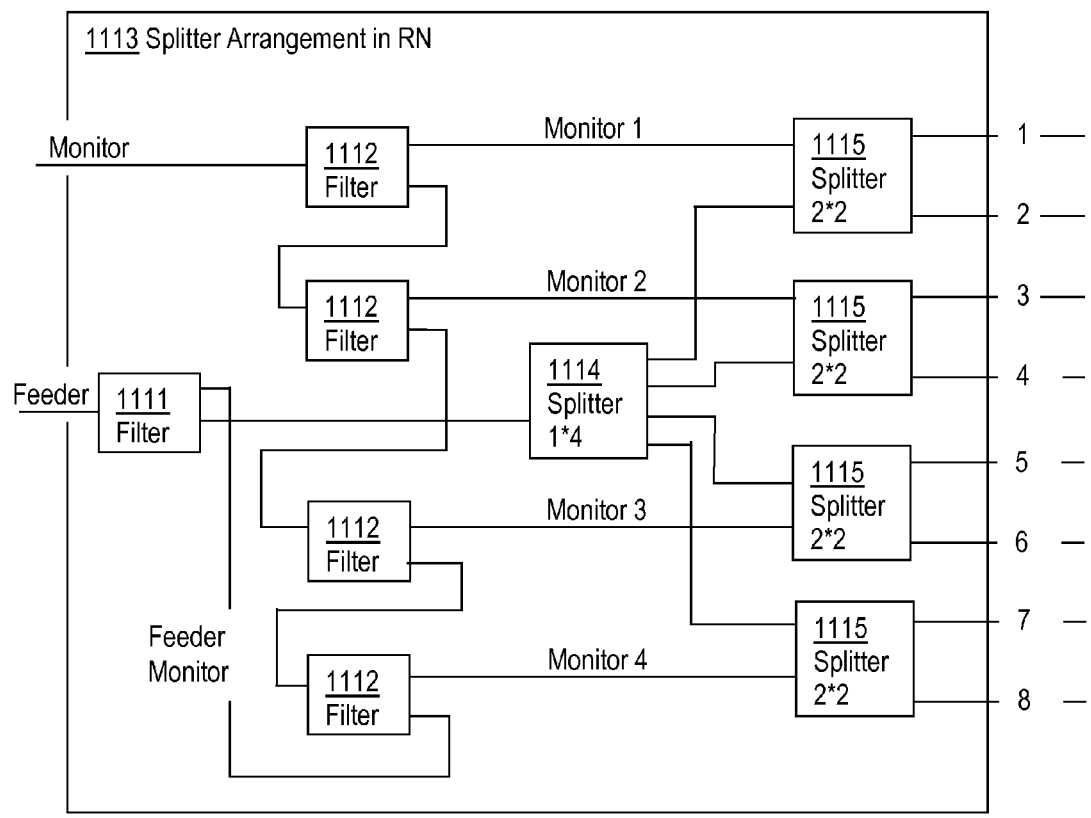
FIG. 11b is a block diagram illustrating an exemplifying splitter arrangement in a Remote Node.

FIG. 11b is a block diagram illustrating an exemplifying splitter arrangement 1113 in a Remote Node 1110 in accordance with the shown illustration of the PON in FIG. 11a. The splitter arrangement is similar to the splitter arrangement described in FIG. 6b and will not be described again, to avoid unnecessary repetition. However, the exemplifying splitter arrangement in a Remote Node in accordance with the shown illustration of the PON in FIG. 11a comprises four 2*2 splitters 1115 constituting a second splitter stage. In this example, 4 different monitoring or supervision fibre links are illustrated being inputted from filters 1112 to 4 different 2*2 splitters 1115. This example illustrates that 4 different pre-selected wavelengths are required in order to supervise 8 output links of the RN 1100. Looking at FIG. 11a, it is illustrated that each of the 8 fibre links from the RN 1110 is connected to a 1*4 splitter 1120 and, consequently, 4 ONTs. As described in relation to FIGS. 8b, 9b, and 10b, a group of ONTs that can be supervised or monitored by one specific pre-selected wavelength comprises 8 ONTs.

Figure 12A:
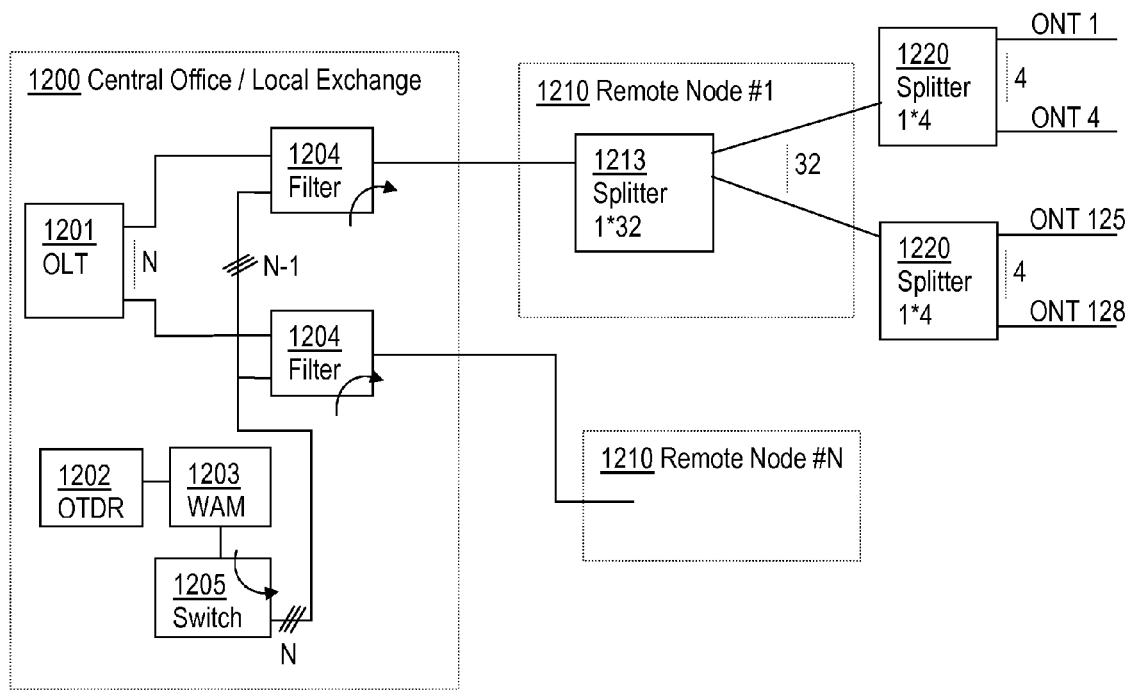
FIG. 12a is a block diagram of yet an exemplifying embodiment of a PON, in which a Wavelength Adaptation Module is employed.

FIG. 12a is a block diagram of an exemplifying embodiment of a PON, in which a Wavelength Adaptation Module is employed. The architecture illustrated in FIG. 12a is N*128 (00/32/04) wherein the OTDR signal having a pre-selected wavelength is sent towards the RN on a feeder fibre.

FIG. 12a illustrates a central office or local exchange 1200 comprising an OLT 1201 having N outputs, an OTDR device 1202 and a Wavelength Adaptation Module 1203. The central office or local exchange 1200 further comprises a switch 1205 having an input connected to an output of the Wavelength Adaptation Module 1203. The switch 1205 is adapted to receive an OTDR signal having a pre-selected wavelength and to forward the signal, via N outputs, to N filters 1204. Each of the N filters 1204 has two inputs, a first input for receiving a data information signal from the OLT 1201 and a second input for receiving the OTDR signal having the pre-selected wavelength from the switch 1205. Each of the N filters 1204 is configured to forward both the data information signal and the OTDR signal having the pre-selected wavelength on a respective feeder fibre to a respective RN 1210. This means that there are N RNs 1210 and N feeder fibres. Each of the RN 1210 comprises a 1*32 splitter arrangement 1213. Following the RN 1210 is a 1*4 splitter 1220 on each of the 32 fibre links from the 1*32 splitter arrangement 1213. In this manner, one RN 1210 is connected to 128 ONTs.

Figure 12B:
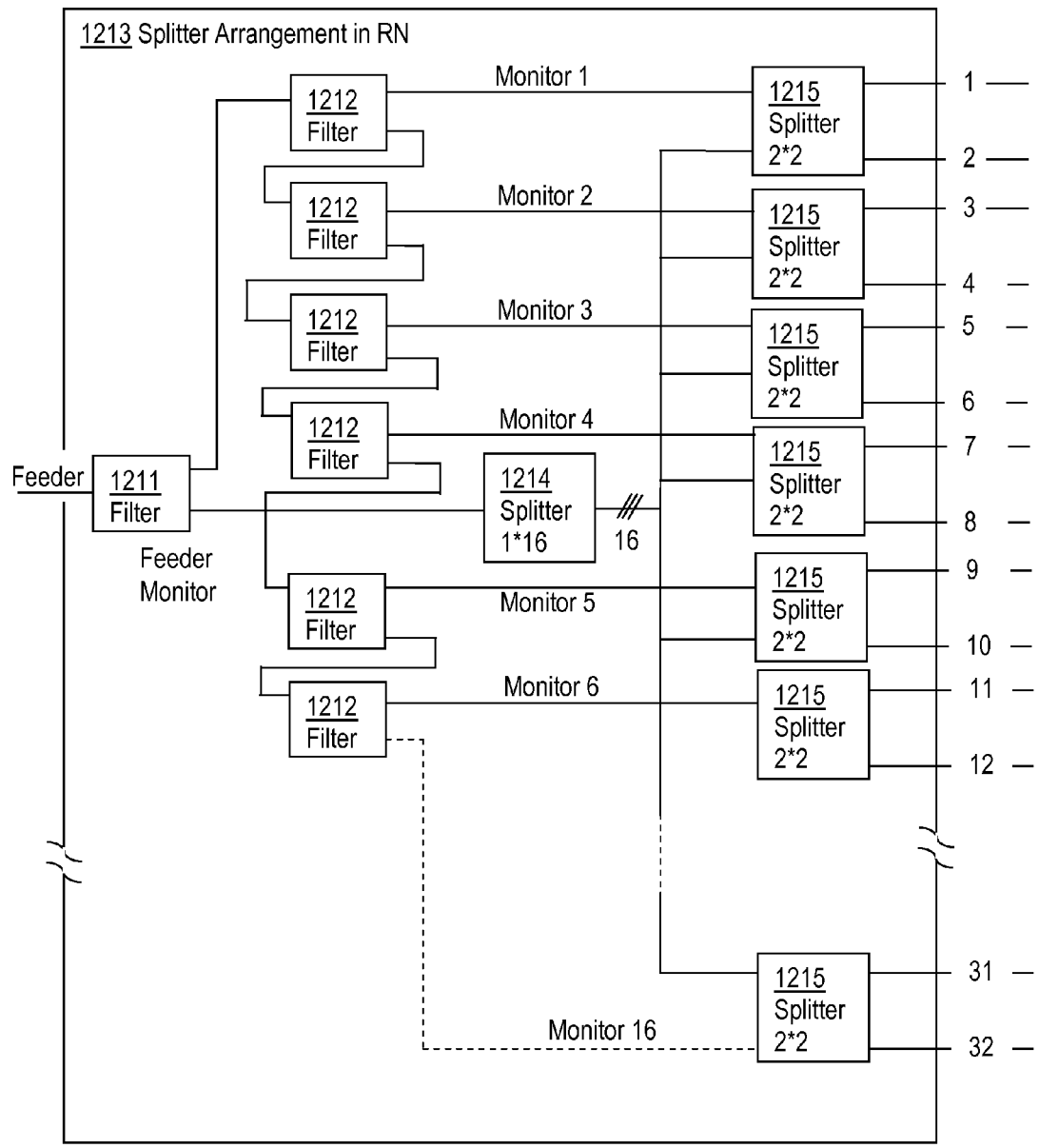
FIG. 12b is a block diagram illustrating an exemplifying splitter arrangement in a Remote Node.

FIG. 12b is a block diagram illustrating an exemplifying splitter arrangement 1213 in a Remote Node 1210 in accordance with the shown illustration of the PON in FIG. 12a. The RN 1210 is provided with a first filter 1211 which is configured to separate the OTDR signal having the pre-selected wavelength and the data information signal. The first filter 1211 forwards the data information signal to a first 1*16 splitter 1214 constituting a first splitter stage. The first splitter 1214 forwards the data information signal to 16 different 2*2 splitters 1215 constituting a second splitter stage. The data information signal is inserted into one of the two inputs of each 2*2 splitter 1215. The first filter 1211 is further configured to forward the OTDR signal having the pre-selected wavelength to a series of filters 1212, each having one input and two outputs. As was described before in relation to FIGS. 6b, 7b and 8b, each of the filters 1212 is configured to receive the OTDR signal having the pre-selected wavelength from a preceding filter. The preceding filter being either the first filter 1211 or a filter 1212 in the series of filters 1212. Each of the filters 1212 is configured to "match" the pre-selected wavelength of the received OTDR signal to a value which is specific for that particular filter 1212. If the pre-selected wavelength "matches" the value which is specific for that particular filter 1212, the filter 1212 is configured to forward the OTDR signal having the pre-selected wavelength to a second input of a specific 2*2 splitter 1215 being connected to the particular filter 1212 in question. In case there is no "match", each of the filters 1212 are configured to forward the OTDR signal having the pre-selected wavelength to a subsequent filter 1212. However, for the last filter 1212 in the series of filter, it has no subsequent filter 1212 since it is the last filter 1212 in the series. If a match in the last filter 1212 in the series of filters 1212 does not "find a match" between the pre-selected wavelength of the received OTDR signal and the value which is valid to the last filter 1212, then the last filter 1212 is configured to simply discard the received OTDR signal having the pre-selected wavelength. As in the previous described FIGS. 8b, 9b, 10b and 11b, one single "monitor fibre link", e.g. Monitor 1 is forwarded to two fibre links (1 and 2) in FIG. 12b. Looking at FIG. 12a, a single fibre link is connected to a 1*4 splitter 1220 and, consequently, to 4 ONTs. Since Monitor 1 if forwarded to two fibre links, Monitor 1 is forwarded to 8 ONTs (2*4). Hence a group of ONTs that can be measured by a single pre-selected wavelength of the OTDR signal comprises 8 ONTs.

Figure 13A:
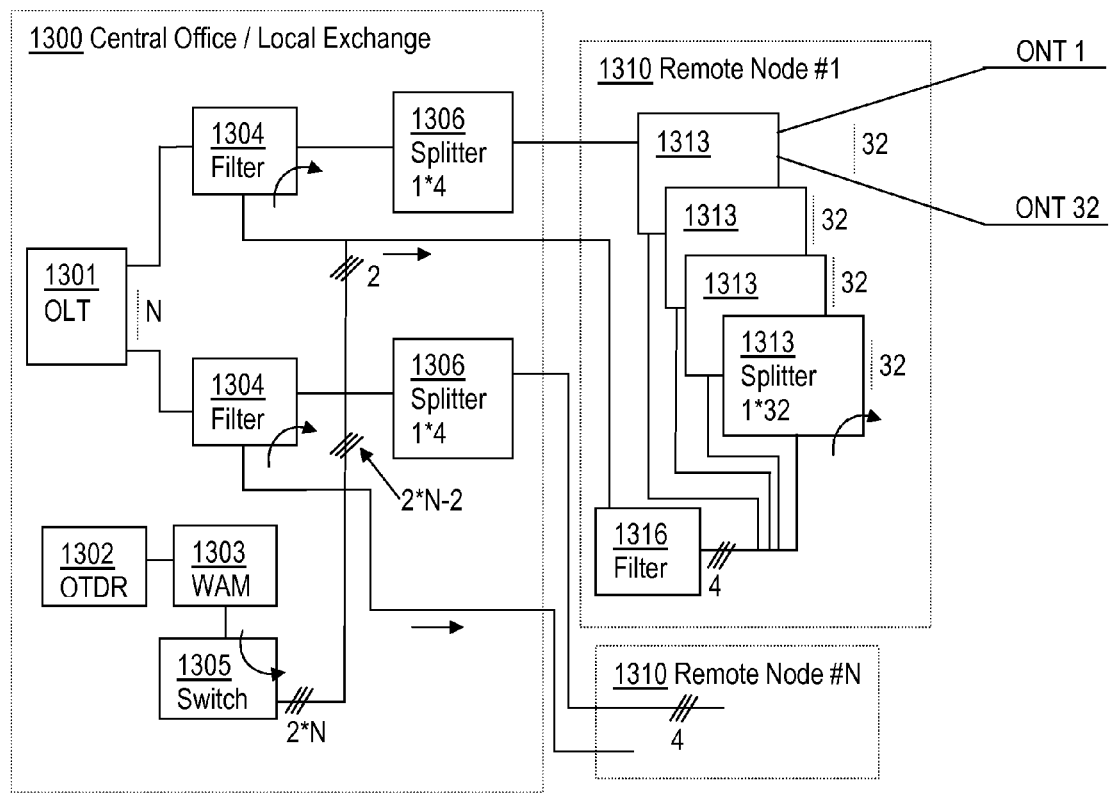
FIG. 13a is a block diagram of yet an exemplifying embodiment of a PON, in which a Wavelength Adaptation Module is employed.

FIG. 13a is a block diagram of an exemplifying embodiment of a PON, in which a Wavelength Adaptation Module is employed. The architecture illustrated in FIG. 13a is N*128 (04/32/00) wherein the OTDR signal having a pre-selected wavelength is sent towards the RN on a dedicated fibre link.

FIG. 13a is similar to FIG. 11a with some differences. The central office or local exchange 1300 is provided with N different 1*4 splitters 1306 instead of N different 1*2 splitters 1106. Each of the N RNs 1310 comprises 4 different 1*32 splitters instead of 2 different 1*8 splitters 1113. Since the RN 1310 has 4 different 1*32 splitters the RN supports 128 ONTs (4*32=128).

Figure 13B:
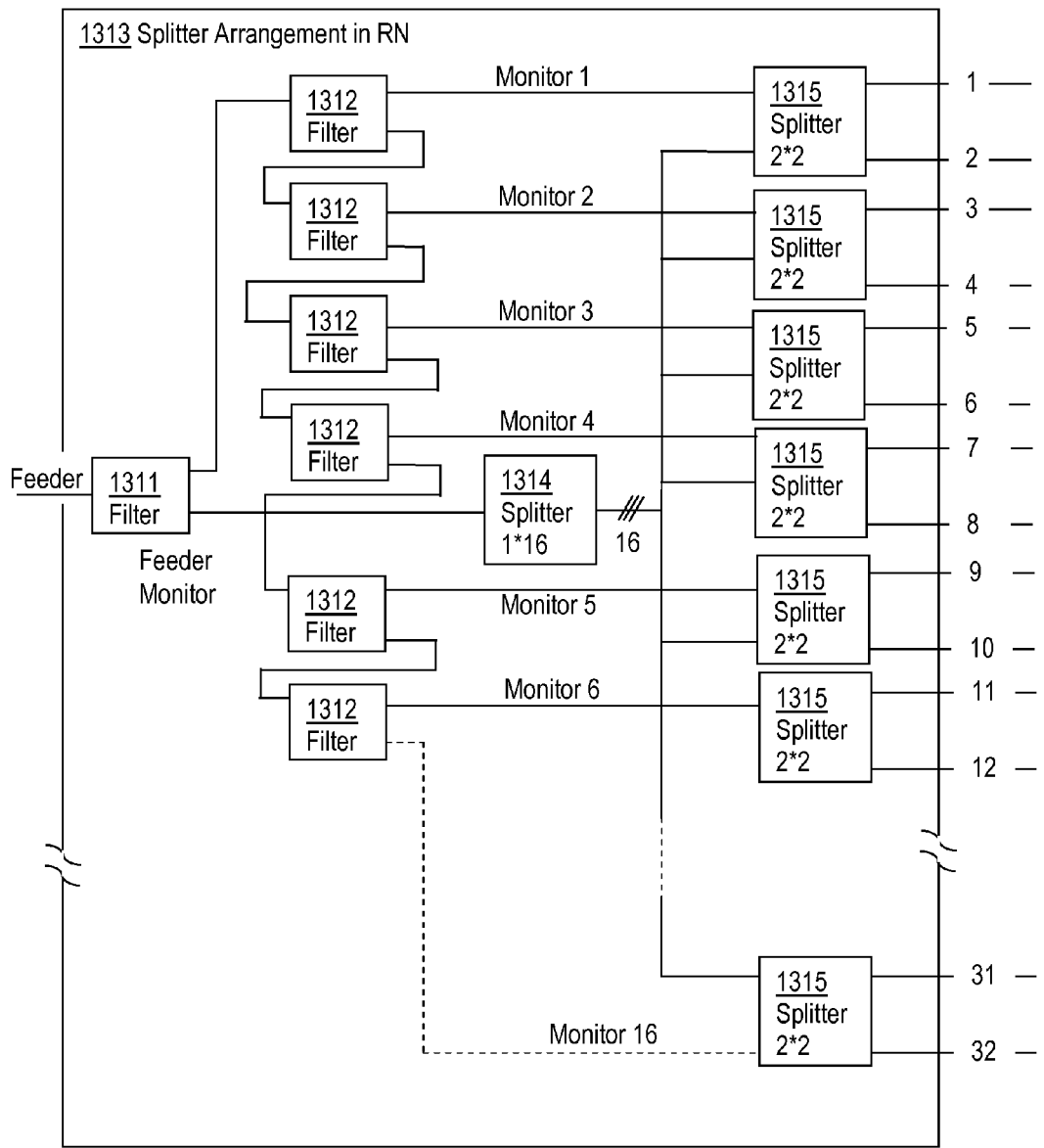
FIG. 13b is a block diagram illustrating an exemplifying splitter arrangement in a Remote Node.

FIG. 13b is a block diagram illustrating an exemplifying splitter arrangement 1313 in a Remote Node 1310 in accordance with the shown illustration of the PON in FIG. 13a. This exemplifying splitter arrangement corresponds to the exemplifying splitter arrangement described in relation to FIG. 12b and will not be repeated again to avoid unnecessary repetition. However, in the example, one single "monitor fibre link", e.g. Monitor 1 is forwarded to two fibre links (1 and 2) in FIG. 13b. Looking at FIG. 13a, a single fibre link is connected to one ONT. This illustrates that a single pre-selected wavelength of the OTDR signal is used to monitor 2 ONTs. However, looking at FIG. 13a, the local exchange or central office 1300 comprises 2 different 1*4 splitters 1306. One such 1*4 splitter 1306 is connected to 4 different multistage splitters 1313 and the OTDR signal having the pre-selected wavelength is forwarded to each of the RNs 1300 on a dedicated fibre link. This means that the OTDR signal having a pre-selected wavelength is forwarded to the 4 different multistage splitters 1313. As a consequence each of the "monitor fibre links", e.g. Monitor 1, is used in 4 different multistage splitter arrangements 1313 and hence, a group of ONTs that can be measured by a single pre-selected wavelength of the OTDR signal comprises 8 ONTs (4*2).

Figure 14A:
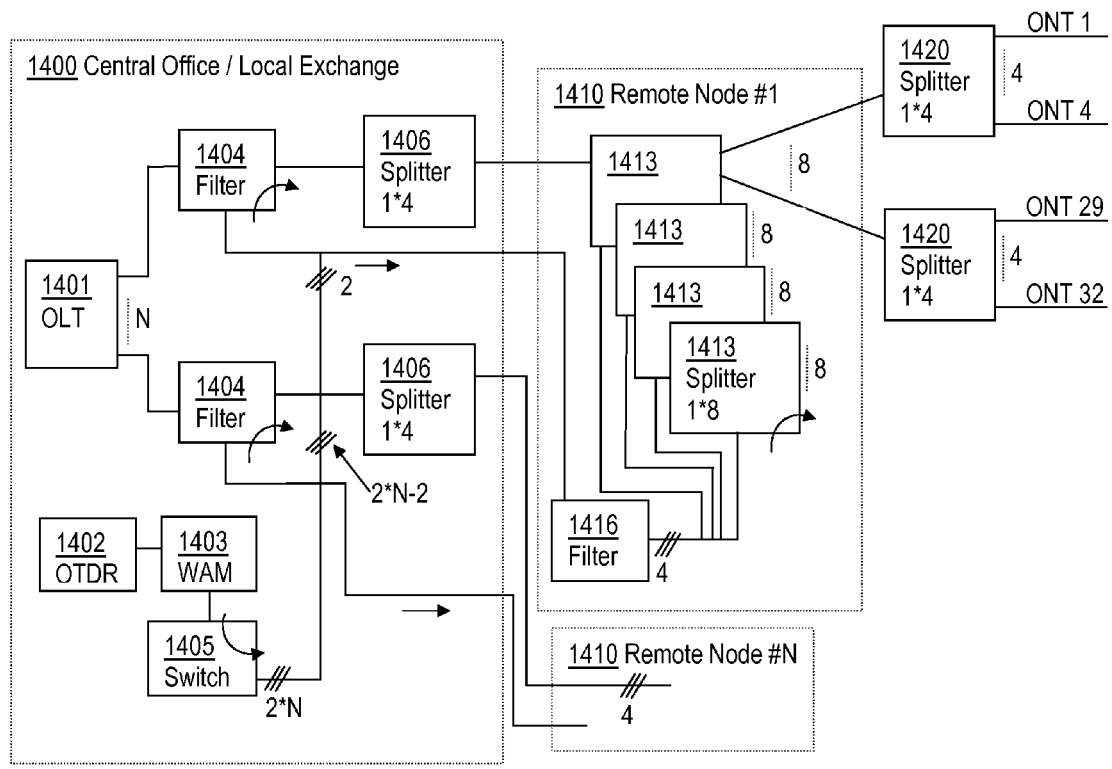
FIG. 14a is a block diagram of yet an exemplifying embodiment of a PON, in which a Wavelength Adaptation Module is employed.

FIG. 14a is a block diagram of an exemplifying embodiment of a PON, in which a Wavelength Adaptation Module is employed. The architecture illustrated in FIG. 14a is N*128

(04/08/04) wherein the OTDR signal having a pre-selected wavelength is sent towards the RN on a dedicated fibre link.

In this example, the central office or local exchange 1400 corresponds to the central office or local exchange 1300 illustrated in FIG. 13*a*. Each of the N different RNs 1410 differs from the RNs 1310 illustrated in FIG. 13*a* in that is comprises 4 different 1*8 splitter arrangements 1413 instead of 4 different 1*32 splitter arrangements 1313. Further, following each of the N RNs 1410, each of the 8 outputs from each of the 4 different 1*8 splitter arrangements 1413 is connected to a 1*4 splitter 1420. This means that each of the 4 different splitter arrangements 1413 is connected to 32 ONTs (8*4) and each of the RNs 1410 is connected to 128 ONTs (4*32).

Figure 14B:
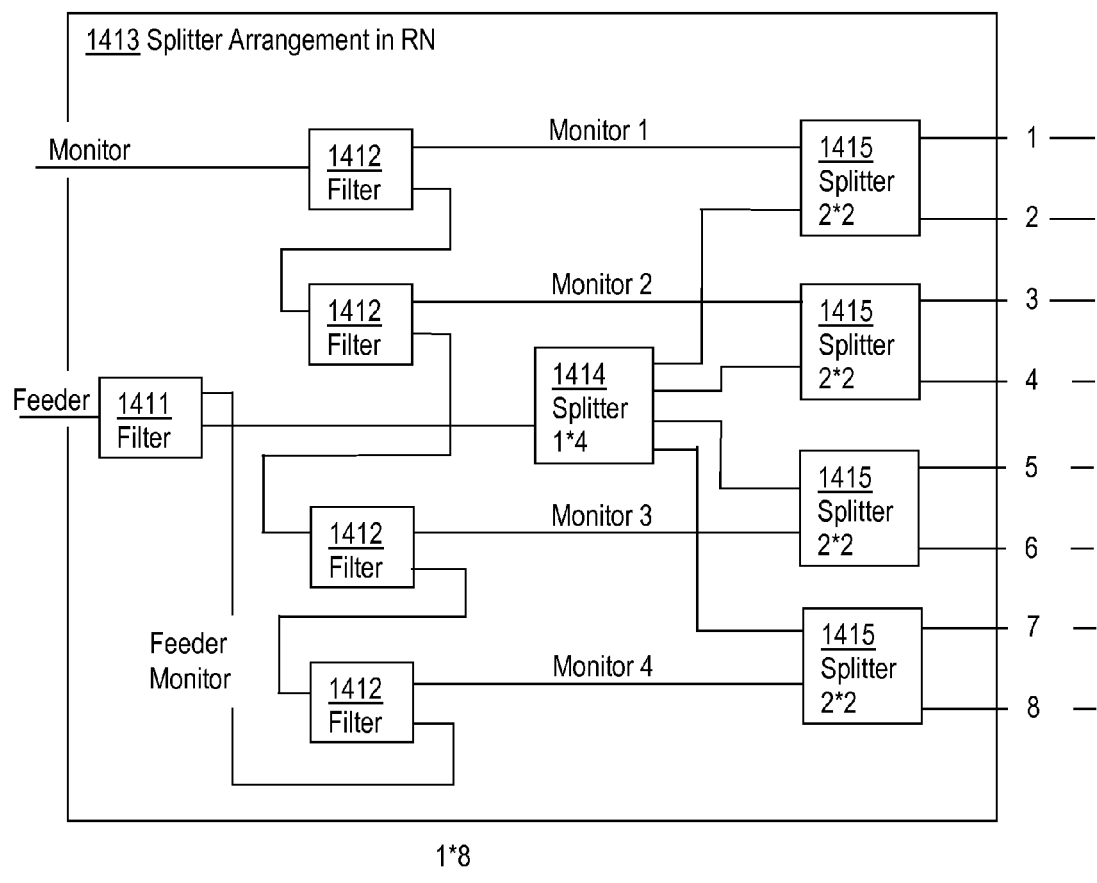
FIG. 14b is a block diagram illustrating an exemplifying splitter arrangement in a Remote Node.

FIG. 14*b* is a block diagram illustrating an exemplifying splitter arrangement 1413 in a Remote Node in accordance 1410 with the shown illustration of the PON in FIG. 14*a*. This is similar to FIG. 6*b* and differs in that the last splitter stage comprises 4 different 2*2 splitters 1415 and not 4 different 2*8 splitters 615 as in FIG. 6*b*. As can be seen in the FIG. 14*b*, a pre-selected wavelength can provide supervision or monitoring of 2 different ONTs, since the "monitor fibre link", i.e. Monitor 1, Monitor 2, Monitor 3 and Monitor 4 is inputted into a splitter having two outputs. This means that the OTDR signal having a preselected wavelength is forwarded to one single "monitor fibre link" in relation to the pre-selected wavelength, e.g. Monitor 1, and is the forwarded on 2 output fibre links (1 and 2). Looking at FIG. 14, each fibre link from the RN 1410 is connected to a 1*4 splitter 1420 resulting in that a group of ONTs that can be measured by a single pre-selected wavelength of the OTDR signal comprises 8 ONTs.

It should be noted that FIG. 2*a* merely illustrates various functional units in the Wavelength Adaptation Device in a logical sense. The functions in practice may be implemented using any suitable software and hardware means/circuits etc. Thus, the embodiments are generally not limited to the shown structures of the Wavelength Adaptation Device and the functional units. Hence, the previously described exemplary embodiments may be realised in many ways.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a Wavelength Adaptation Module for adapting an Optical Time Domain Reflectometry (OTDR) signal for supervision of Optical Network Terminals (ONTs) in a Passive Optical Network (PON), the method comprising:
   receiving an OTDR signal comprising at least one wavelength;
   Red/Blue (R/B) filtering the received OTDR signal;
   converting the filtered OTDR signal to a photoelectric current;
   amplitude modulating said photoelectric current and an optical signal having a pre-selected wavelength from a Continuous Wavelength light source, thereby producing an amplitude modulated signal having the pre-selected wavelength of said optical signal; and
   outputting said amplitude modulated signal towards a Remote Node (RN),
   wherein said wavelength of said optical signal has been pre-selected to enable a splitter in said RN to forward said amplitude modulated signal to a dedicated group of ONTs in the PON, thereby supervising fibre links between the RN and the dedicated group of ONTs, and wherein the OTDR signal and the optical signal having the pre-selected wavelength are received as a result of an alarm issued by an ONT belonging to said dedicated group of ONTs.

2. The method according to claim 1, further comprising optically amplifying said amplitude modulated signal, and filtering said optically amplified amplitude modulated signal before outputting said amplitude modulated signal towards said RN.

3. The method according to claim 1, further comprising receiving back-scattered light from the fibre links between the RN and the dedicated group of ONTs, and forwarding said back-scattered light to an OTDR device, thereby enabling analysis of said back-scattered light in order to detect any possible fault in any link between the RN and the dedicated group of ONTs.

4. The method according to claim 1, wherein said optical signal is a laser signal.

5. The method according to claim 1, wherein said outputting of said amplitude modulated signal towards said RN comprises transmitting said amplitude modulated signal to said RN on a dedicated fibre link, or on a feeder fibre link carrying data information from an Optical Line Terminal (OLT) to said RN.

6. A Wavelength Adaptation Module configured to adapt an Optical Time Domain Reflectometry (OTDR) signal for supervision of Optical Network Terminals (ONTs) in a Passive Optical Network (PON), the Wavelength Adaptation Module being adapted to:
   receive an OTDR signal comprising at least one wavelength;
   Red/Blue (R/B) filter the received OTDR signal;
   convert the filtered OTDR signal to a photoelectric current;
   amplitude modulate said photoelectric current and an optical signal having a pre-selected wavelength from a Continuous Wavelength light source, thereby producing an amplitude modulated signal having the pre-selected wavelength of said optical signal; and
   output said amplitude modulated signal towards a Remote Node, (RN), wherein said pre-selected wavelength of said optical signal has been pre-selected to enable a splitter in said RN to forward said amplitude modulated signal a dedicated group of ONTs in the PON, thereby supervising fibre links between the RN and the dedicated group of ONTs, and wherein the OTDR signal and the optical signal having the pre-selected wavelength are received as a result of an alarm issued by an ONT belonging to said dedicated group of ONTs.

7. The Wavelength Adaptation Module according to claim 6, further adapted to optically amplify said amplitude modulated signal, and to filter said optically amplified amplitude modulated signal before outputting said amplitude modulated signal towards said RN.

8. The Wavelength Adaptation Module according to claim 6, further adapted to receive back-scattered light from the fibre links between the RN and the dedicated group of ONTs, and to forward said back-scattered light to an OTDR device, thereby enabling analysis of said back-scattered light in order to detect any possible fault in any link between the RN and the dedicated group of ONTs.

9. The Wavelength Adaption Module according to claim 6, wherein said optical signal is a laser signal.

10. The Wavelength Adaption Module according to claim 6, wherein the Wavelength Adaptation Module is adapted to output said amplitude modulated signal towards said RN by transmitting said amplitude modulated signal to said RN on a dedicated fibre link, or on a feeder fibre link carrying data information from an Optical Line Terminal (OLT) to said RN.

11. A method in a Remote Node (RN) in a Passive Optical Network (PON), the PON comprising Optical Network Terminals (ONTs), and a Wavelength Adaptation Module arranged in a fibre path between an Optical Time Domain Reflectometry (OTDR) device and said RN, the RN comprising a passive splitter arrangement, the method comprising:
- receiving an amplitude modulated signal having a pre-selected wavelength from said Wavelength Adaptation Module on a dedicated fibre link, wherein the pre-selected wavelength of the amplitude modulated signal has been pre-selected to enable a splitter in the RN to forward the amplitude modulated signal to a dedicated group of ONTs in the PON;
- outputting said amplitude modulated signal to the dedicated group of ONTs with regards to the pre-selected wavelength of said received amplitude modulated signal; and
- filtering out said received amplitude modulated signal, and transmitting said amplitude modulated signal also on a feeder fibre link between an optical line terminal (OLT) and said RN.

12. The method according to claim 11, wherein said passive splitter arrangement comprises a multi-stage splitter, and wherein the method comprises inserting said received amplitude modulated signal having the pre-selected wavelength after a first splitter stage of said multi-stage splitter.

13. The method according to claim 12, wherein a subsequent splitter stage of said multi-stage splitter, after said first splitter stage, outputs said amplitude modulated signal to said dedicated group of ONTs with regards to the pre-selected wavelength of said received amplitude modulated signal.

14. The method according to claim 12, further comprising receiving said amplitude modulated signal together with a data information signal from an Optical Line Terminal (OLT) and filtering out said amplitude modulated signal before inserting said amplitude modulated signal after said first splitter stage of said multi-stage splitter.

15. A Remote Node (RN) in a Passive Optical Network (PON), the PON comprising Optical Network Terminals (ONTs) and a Wavelength Adaptation Module arranged in a fibre path between an Optical Time Domain Reflectometry (OTDR) device and said RN, said RN comprising a passive splitter arrangement, the RN being adapted to:
- receive an amplitude modulated signal having a pre-selected wavelength from said Wavelength Adaptation Module on a dedicated fibre link, wherein the pre-selected wavelength of the amplitude modulated signal has been pre-selected to enable a splitter in the RN to forward the amplitude modulated signal to a dedicated group of ONTs in the PON;
- output said amplitude modulated signal to the dedicated group of ONTs with regards to the pre-selected wavelength of said received amplitude modulated signal; and
- wherein said RN is further adapted to filter out said received amplitude modulated signal, and to transmit said amplitude modulated signal also on a feeder fibre link between an optical line terminal (OLT) and said RN.

16. The RN according to claim 15, wherein said passive splitter arrangement comprises a multi-stage splitter, and wherein the RN is adapted to insert the received amplitude modulated signal having the pre-selected wavelength after a first splitter stage of said multi-stage splitter.

17. The RN according to claim 16, wherein a subsequent splitter stage of said multi-stage splitter, after said first splitter stage, is adapted to output said amplitude modulated signal to said dedicated group of ONTs with regards to the pre-selected wavelength of said received amplitude modulated signal.

18. The RN according to claim 16, further adapted to receive said amplitude modulated signal together with a data information signal from an Optical Line Terminal (OLT), and to filter out said amplitude modulated signal before inserting said amplitude modulated signal after said first splitter stage of said multi-stage splitter.

* * * * *